United States Patent
Matlack et al.

(10) Patent No.: US 9,289,849 B2
(45) Date of Patent: Mar. 22, 2016

(54) APPARATUS FOR FRICTION STIR WELDING

(71) Applicant: The Boeing Company, Chicago, IL (US)

(72) Inventors: Michael P. Matlack, St. Charles, MO (US); Amy Marie Helvey, Imperial, MO (US); John A. Baumann, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/677,593

(22) Filed: Apr. 2, 2015

(65) Prior Publication Data
US 2015/0209895 A1 Jul. 30, 2015

Related U.S. Application Data

(62) Division of application No. 14/107,864, filed on Dec. 16, 2013, now Pat. No. 9,010,613.

(51) Int. Cl.
B23K 20/12 (2006.01)

(52) U.S. Cl.
CPC .......... *B23K 20/1255* (2013.01); *B23K 20/12* (2013.01); *B23K 20/122* (2013.01); *B23K 20/129* (2013.01); *B23K 20/1225* (2013.01); *B23K 20/1245* (2013.01); *B23K 20/1265* (2013.01)

(58) Field of Classification Search
None
See application file for complete search history.

(56) References Cited

U.S. PATENT DOCUMENTS

| | | |
|---|---|---|
| 6,199,745 B1 | 3/2001 | Campbell et al. |
| 6,676,008 B1 | 1/2004 | Trapp et al. |
| 7,568,608 B1 | 8/2009 | Ding |
| 7,654,435 B2 | 2/2010 | Kumagai et al. |
| 9,010,613 B1 | 4/2015 | Matlack et al. |
| 2002/0179673 A1 | 12/2002 | Strombeck et al. |
| 2003/0205565 A1 | 11/2003 | Nelson et al. |
| 2003/0209588 A1 | 11/2003 | Colligan |
| 2006/0006211 A1 | 1/2006 | Loitz et al. |
| 2006/0289604 A1 | 12/2006 | Zettler et al. |

(Continued)

FOREIGN PATENT DOCUMENTS

| | | | |
|---|---|---|---|
| EP | 0810056 A2 | | 12/1997 |
| FR | 2922796 A | * | 10/2007 |

(Continued)

OTHER PUBLICATIONS

Matlack et al., "Apparatus for and Method of Friction Stir Welding," U.S. Appl. No. 14/107,864, filed Dec. 12, 2013, 70 pages.

(Continued)

Primary Examiner — Kiley Stoner
(74) Attorney, Agent, or Firm — Yee & Associates, P.C.

(57) ABSTRACT

One aspect of the disclosure relates to a friction stir welding apparatus. The friction stir welding apparatus includes a spindle housing and a pin tool concentric with an axis and rotatable relative to the spindle housing about the axis. The friction stir welding apparatus also includes a first shoulder not substantially rotatable relative to the spindle housing about the axis and a second shoulder not substantially rotatable relative to the spindle housing about the axis. The pin tool is rotatable relative to the first shoulder and the second shoulder.

42 Claims, 19 Drawing Sheets

(56) References Cited

U.S. PATENT DOCUMENTS

| | | |
|---|---|---|
| 2007/0228104 A1 | 10/2007 | Mankus et al. |
| 2009/0120995 A1 | 5/2009 | Hallinan et al. |
| 2009/0123778 A1 | 5/2009 | Russell et al. |
| 2009/0236045 A1 | 9/2009 | Burton et al. |
| 2011/0084116 A1 | 4/2011 | Ohashi et al. |
| 2012/0193401 A1 | 8/2012 | Hori et al. |
| 2012/0248174 A1 | 10/2012 | dos Santos et al. |
| 2012/0298727 A1 | 11/2012 | Stol et al. |
| 2013/0255884 A1 | 10/2013 | Bauman et al. |
| 2014/0231490 A1 | 8/2014 | Sato et al. |

FOREIGN PATENT DOCUMENTS

| | | | |
|---|---|---|---|
| JP | 2004114137 A | * | 4/2004 |
| JP | 2007283379 A | | 11/2007 |
| JP | 2009018312 A | * | 1/2009 |
| JP | 2013123746 A | * | 6/2013 |
| JP | 2013166159 A | * | 8/2013 |
| JP | 2013202630 A | * | 10/2013 |

OTHER PUBLICATIONS

Office Action, dated Oct. 2, 2014, regarding U.S. Appl. No. 14/107,864, 18 pages.

Notice of Allowance, dated Dec. 15, 2014, regarding U.S. Appl. No. 14/107,864, 13 pages.

Martin et al., "Novel techniques for corner joints using friction stir welding," The Minerals, Metals & Materials Society 2011 Annual Meeting & Exhibition, Feb.-Mar. 2011, 9 pages.

Extended European Search Report, dated Mar. 31, 2015, regarding application EP14198294.2, 6 pages.

* cited by examiner

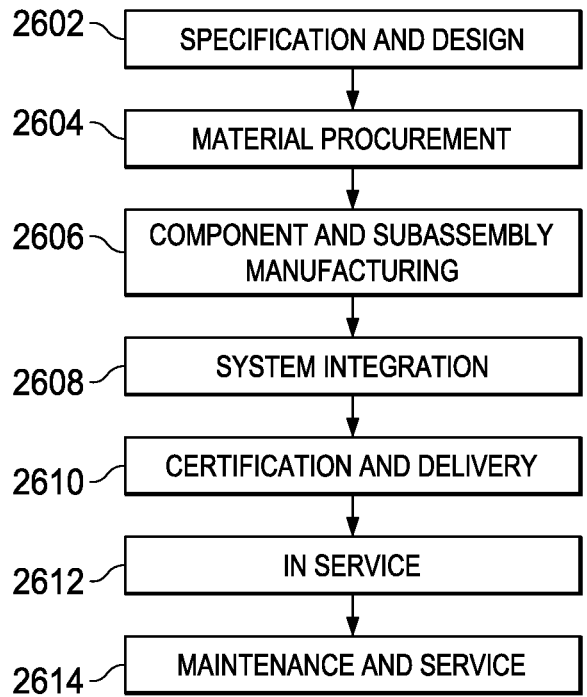
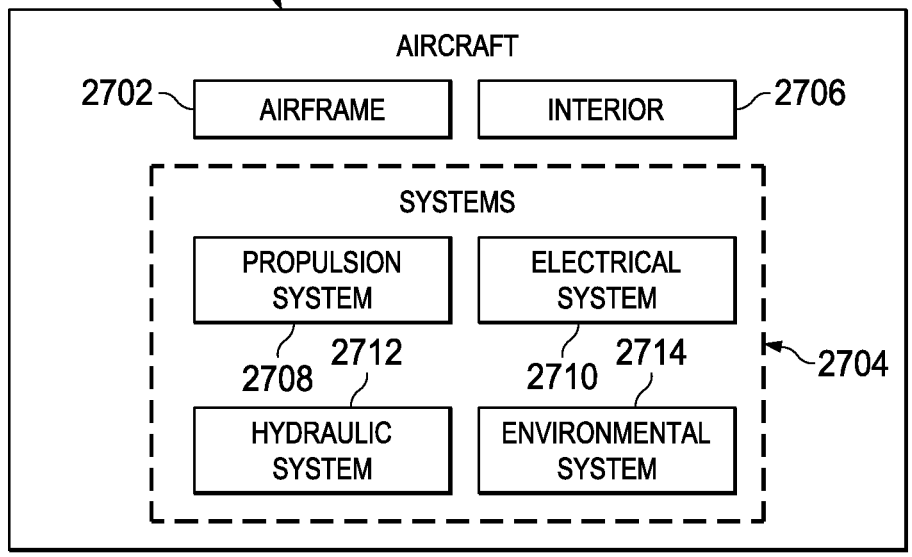

APPARATUS FOR FRICTION STIR WELDING

CROSS-REFERENCE TO RELATED APPLICATION(S)

This application is a divisional of and claims the benefit of priority to U.S. patent application Ser. No. 14/107,864, filed on Dec. 16, 2013 now U.S. Pat. No. 9,010,613, and entitled "Apparatus For Friction Stir Welding", the contents of which are incorporated herein by reference.

BACKGROUND

Parts formed from various metals, such as 2000- and 7000-series aluminum alloys, may be joined by friction stir welding, which has conventionally been associated with simple joint configurations, such as butt joints. Workpieces having more complicated joint geometries, such as corner joints, are friction-stir-welded either from only one side, limiting weld penetration, or from both sides in a sequential manner, which requires plural fixturing operations and additional fixturing equipment, resulting in increased cycle time and manufacturing cost.

SUMMARY

Accordingly, a friction stir welding apparatus and method, intended to address the above-identified concerns, would find utility.

One example of the present disclosure relates to a friction stir welding apparatus. The friction stir welding apparatus includes a spindle housing and a pin tool concentric with an axis and rotatable relative to the spindle housing about the axis. The friction stir welding apparatus also includes a first shoulder not substantially rotatable relative to the spindle housing about the axis and a second shoulder not substantially rotatable relative to the spindle housing about the axis. The pin tool is rotatable relative to the first shoulder and the second shoulder.

One example of the present disclosure relates to a method of joining at least two parts. The method includes forming plasticized material at a joint interface of the at least two parts by rotating a pin tool of a friction stir welding apparatus relative to a spindle housing of the friction stir welding apparatus about an axis concentric with the pin tool; and confining the plasticized material between a first shoulder and a second shoulder of the friction stir welding apparatus. The first shoulder and the second shoulder are opposite to each other along the axis and are not substantially rotatable relative to the spindle housing about the axis.

One example of the present disclosure relates to a friction stir welding apparatus. The friction stir welding apparatus includes a spindle housing and a pin tool concentric with an axis and rotatable relative to the spindle housing about the axis. The friction stir welding apparatus also includes a first shoulder and a second shoulder. One of the first shoulder and the second shoulder is rotatable relative to the spindle housing about the axis. The other of the first shoulder and the second shoulder is not substantially rotatable relative to the spindle housing about the axis.

One example of the present disclosure relates to a method of joining at least two parts. The method includes forming plasticized material at a joint interface of the at least two parts by rotating a pin tool of a friction stir welding apparatus relative to a spindle housing of the friction stir welding apparatus about an axis concentric with the pin tool; and confining the plasticized material between a first shoulder and a second shoulder of the friction stir welding apparatus. One of the first shoulder and the second shoulder is rotatable relative to the spindle housing about the axis. The other of the first shoulder and the second shoulder is not substantially rotatable relative to the spindle housing about the axis. The first shoulder is opposite the second shoulder along the axis.

BRIEF DESCRIPTION OF THE DRAWINGS

Figure 1:
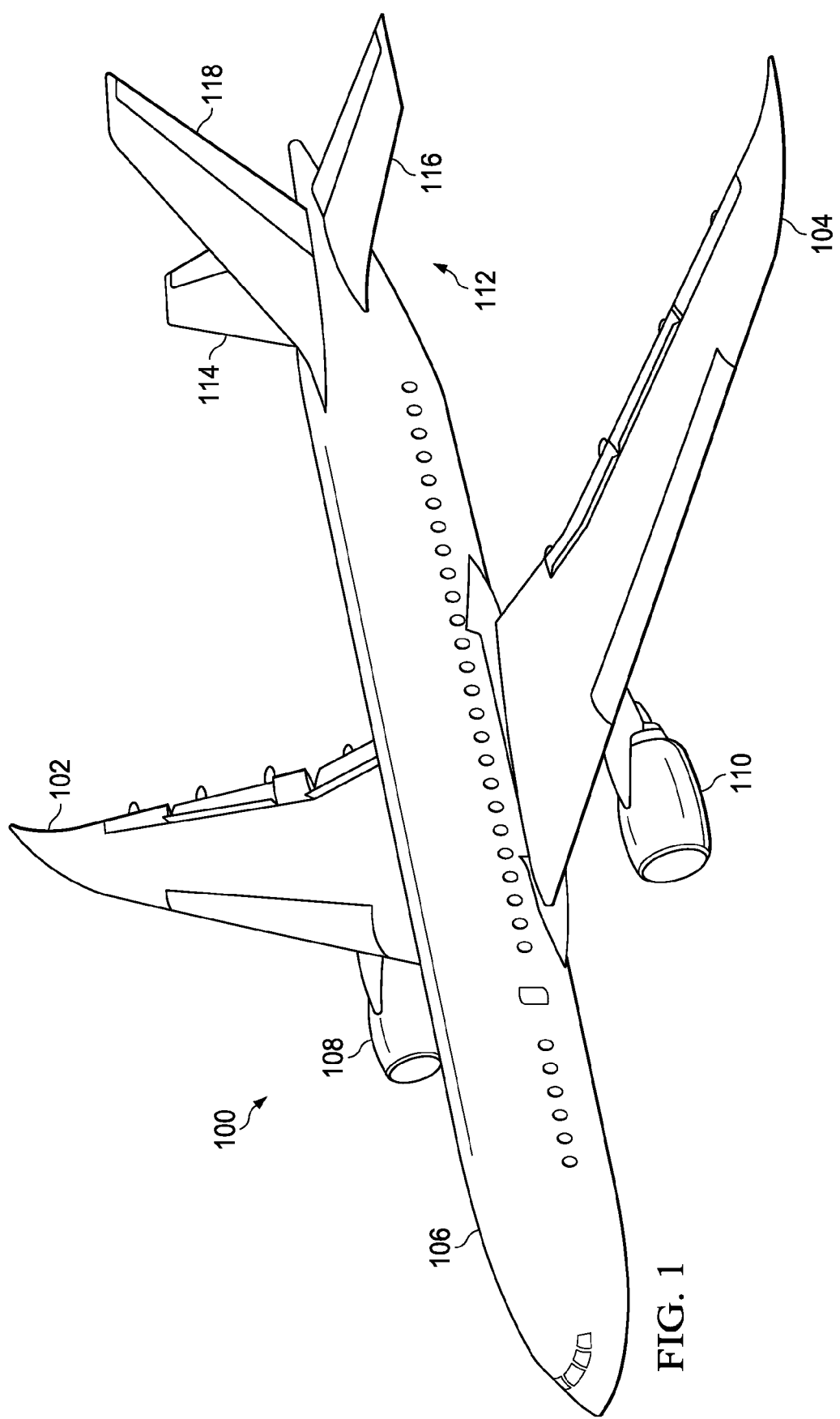
Figure 2:
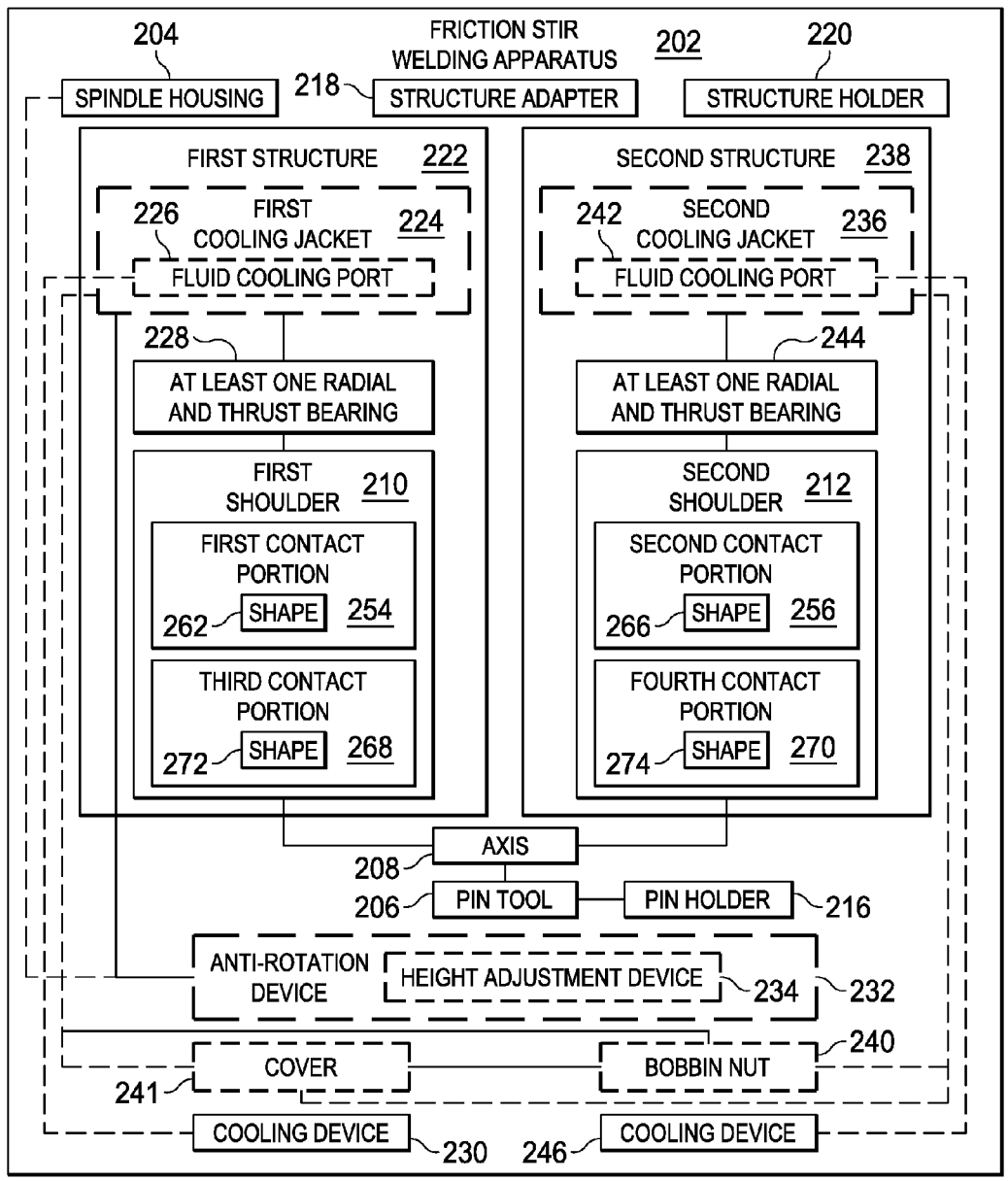
Figure 3:
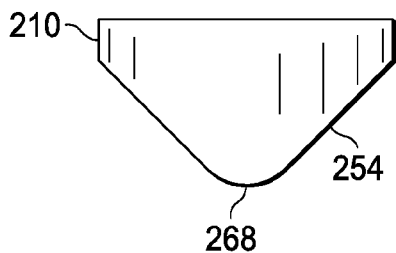
Figure 4:
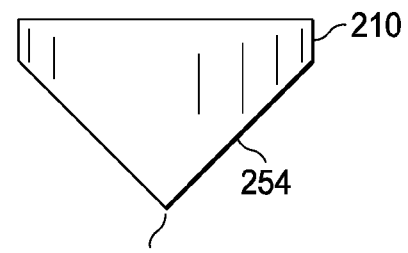
Figure 5:
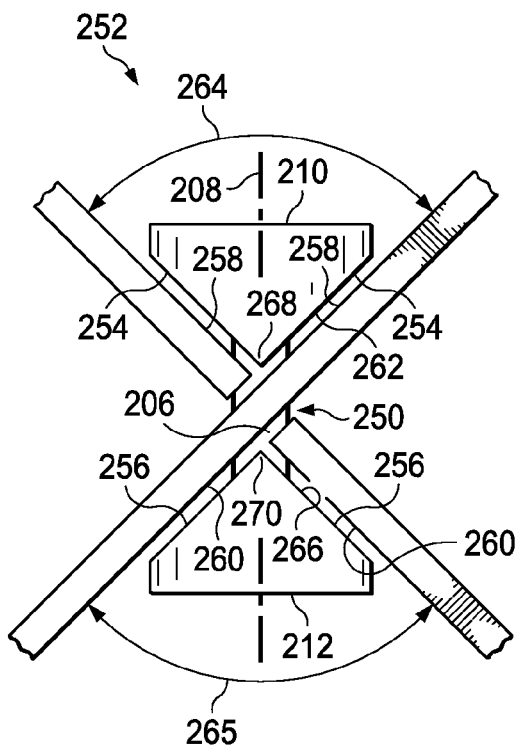
Figure 6:
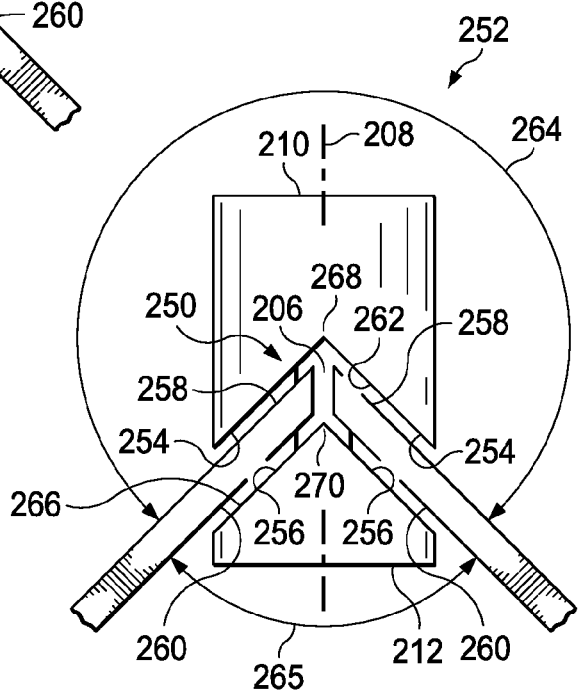
Figure 7:
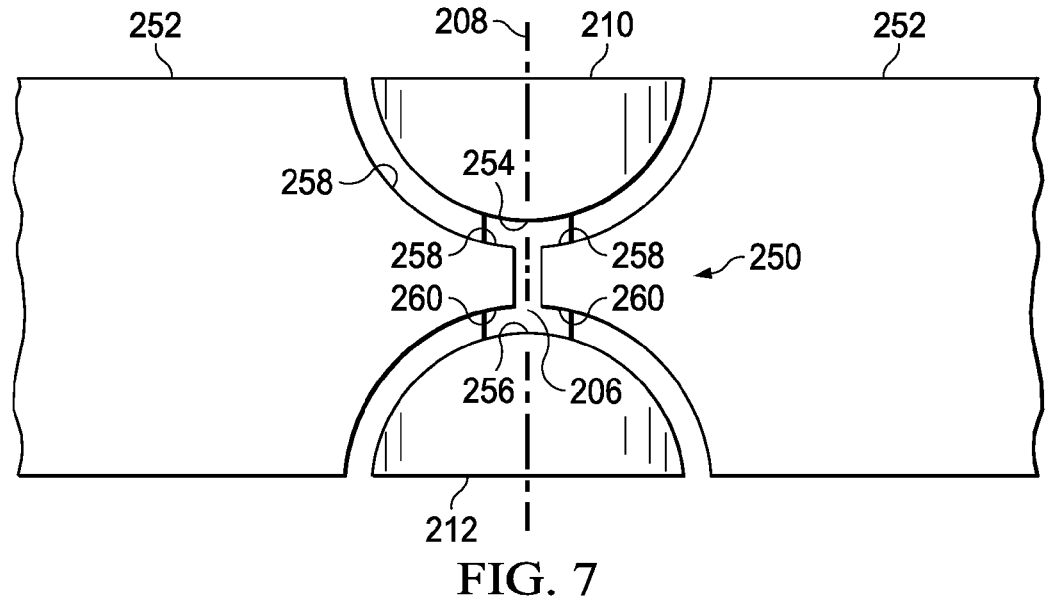
Figure 8:
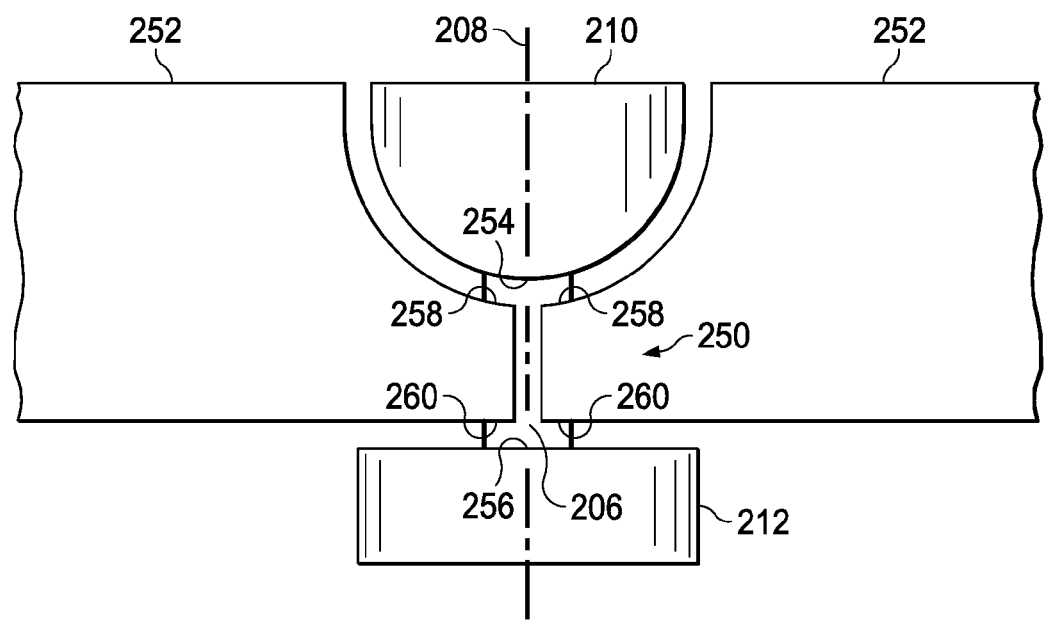
Figure 9:
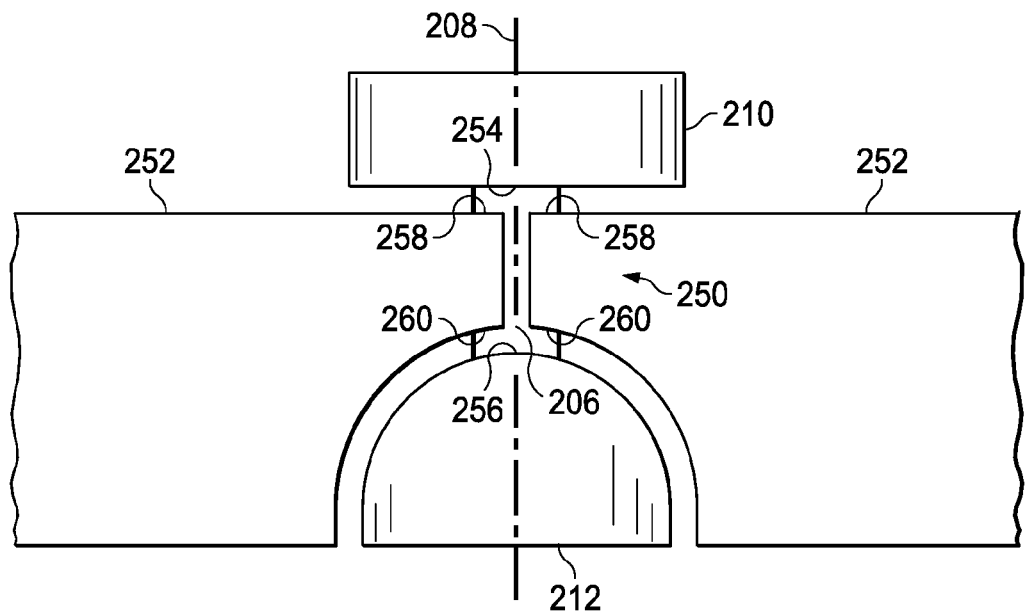
Figure 10:
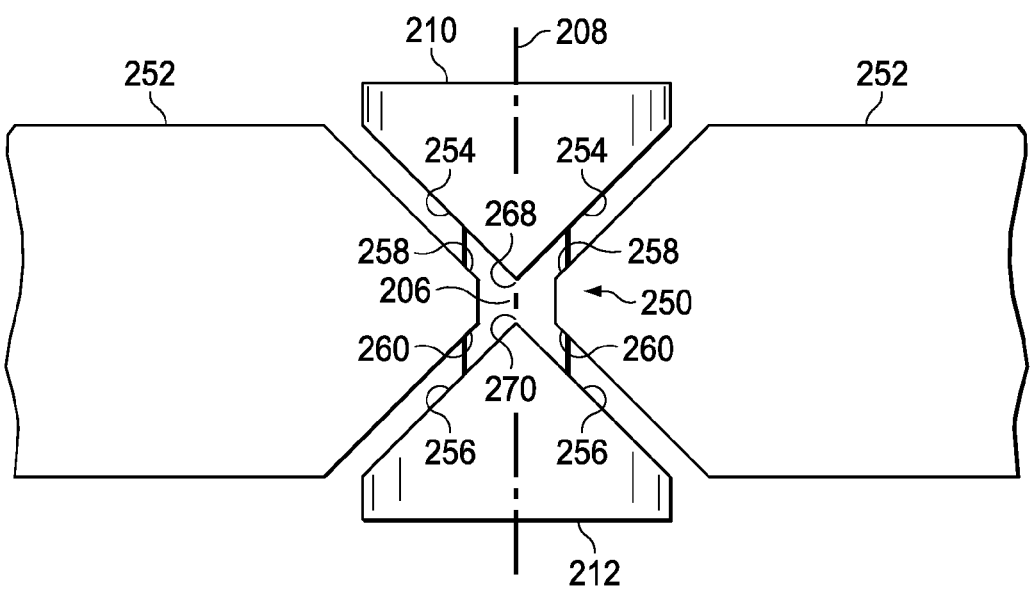
Figure 11:
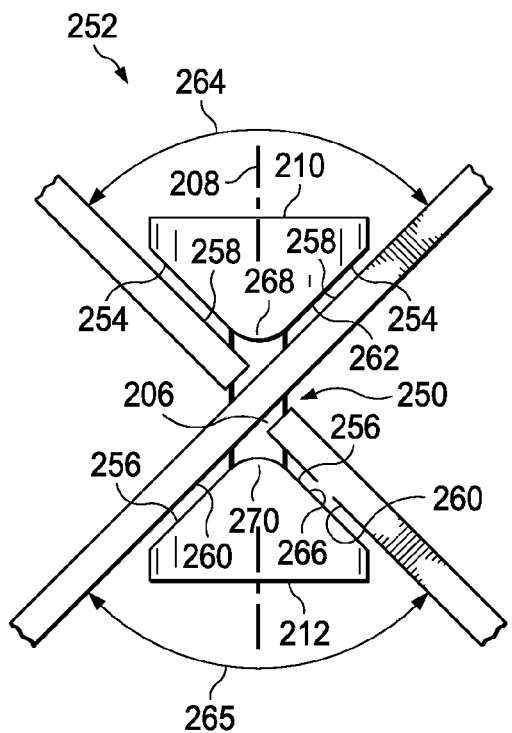
Figure 12:
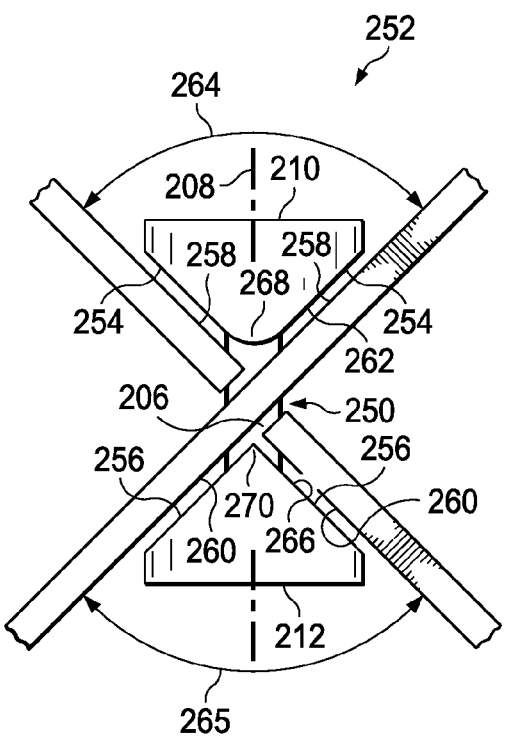
Figure 13:
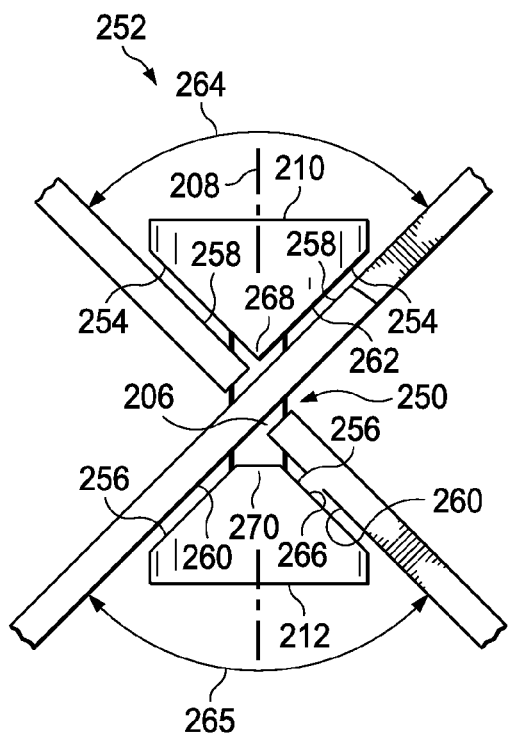
Figure 14:
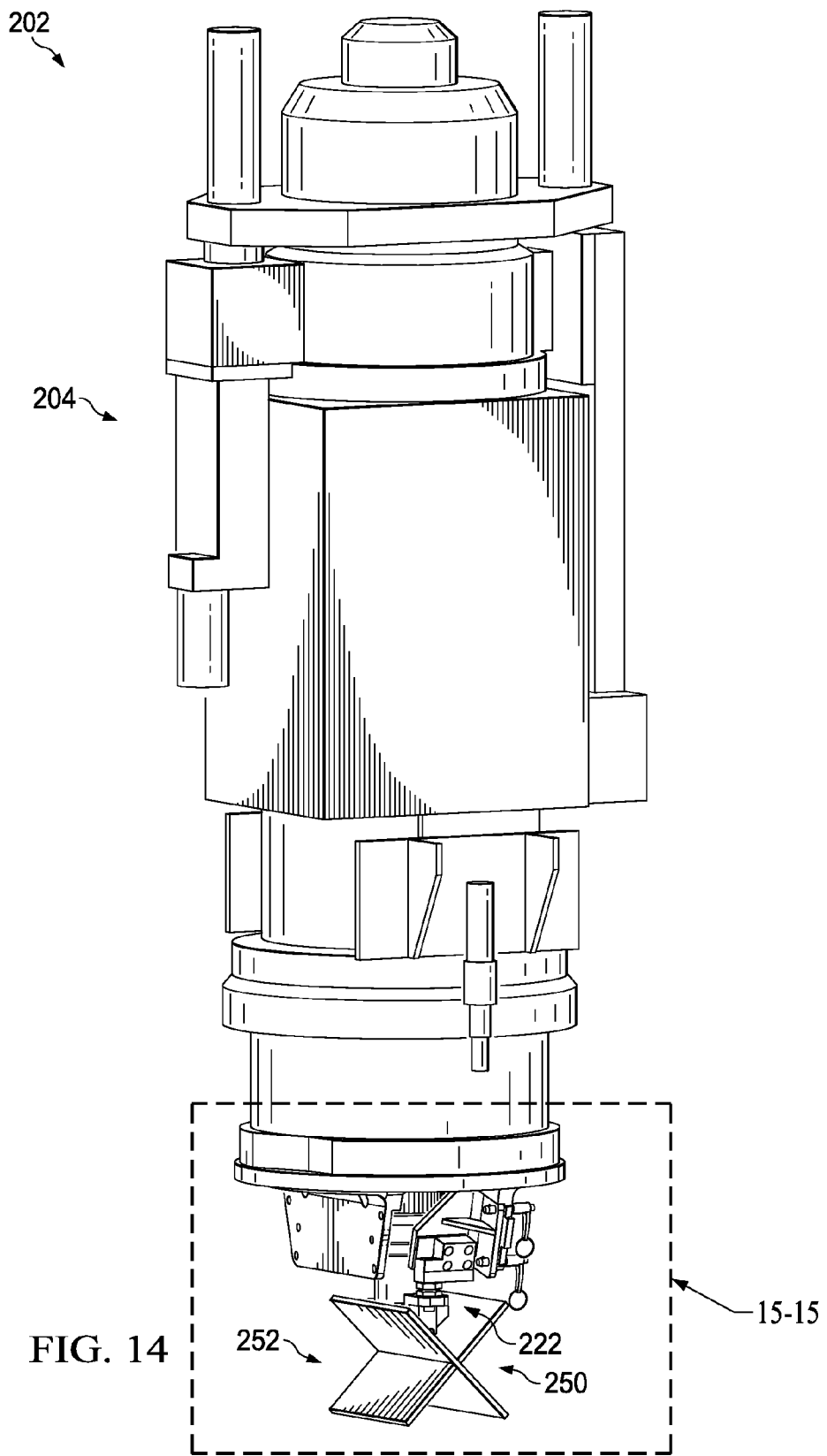
Figure 15:
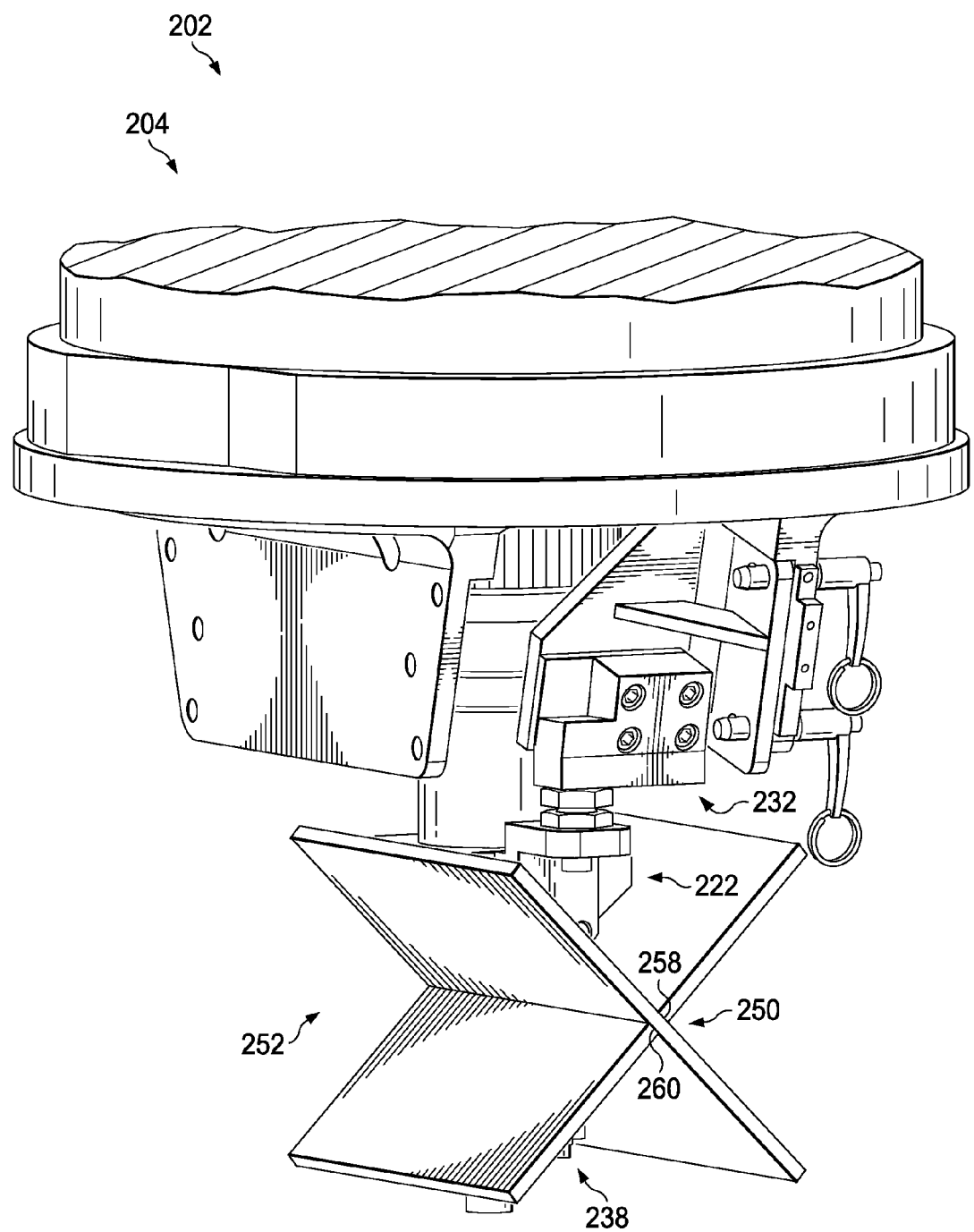
Figure 16:
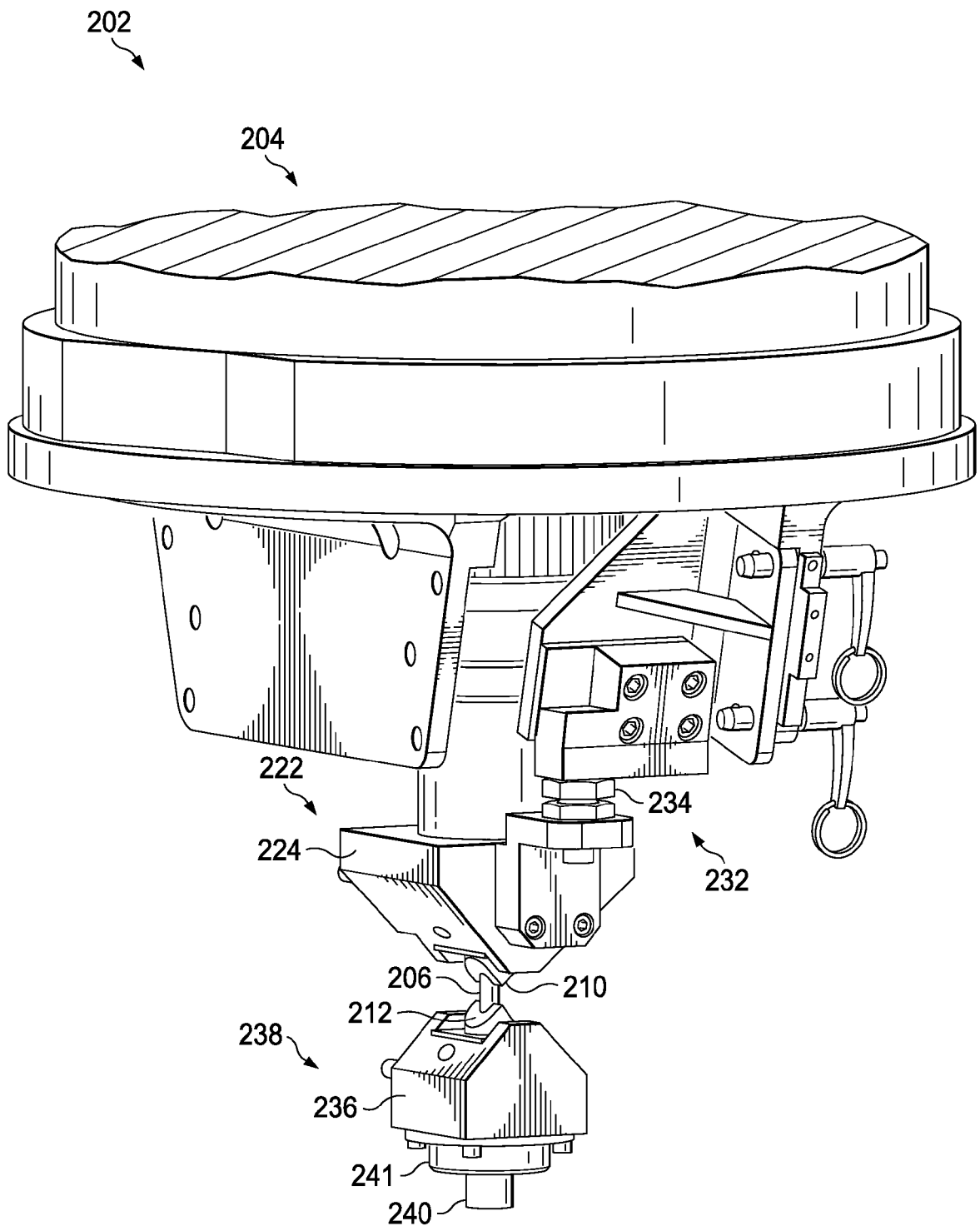
Figure 17:
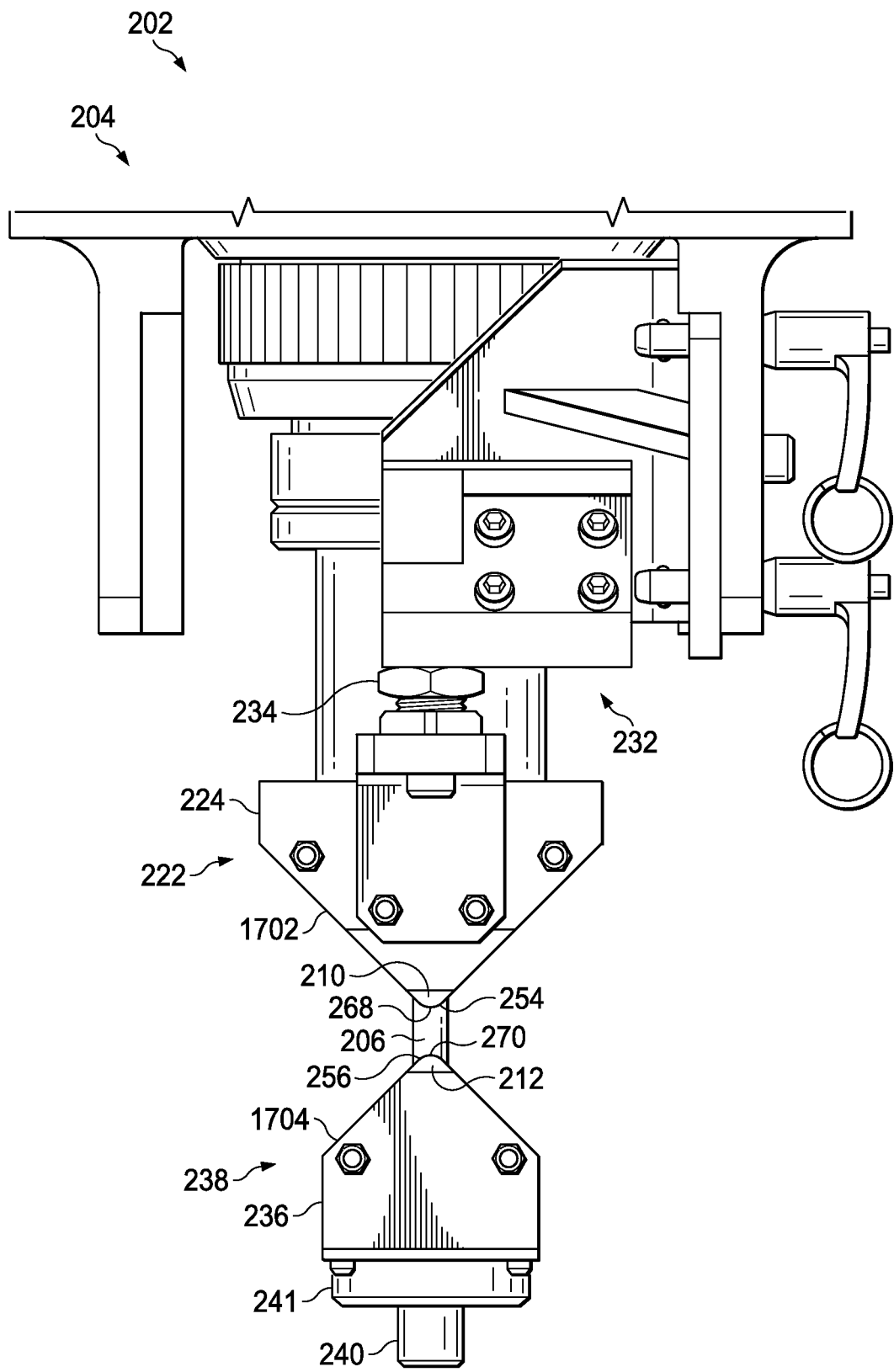
Figure 18:
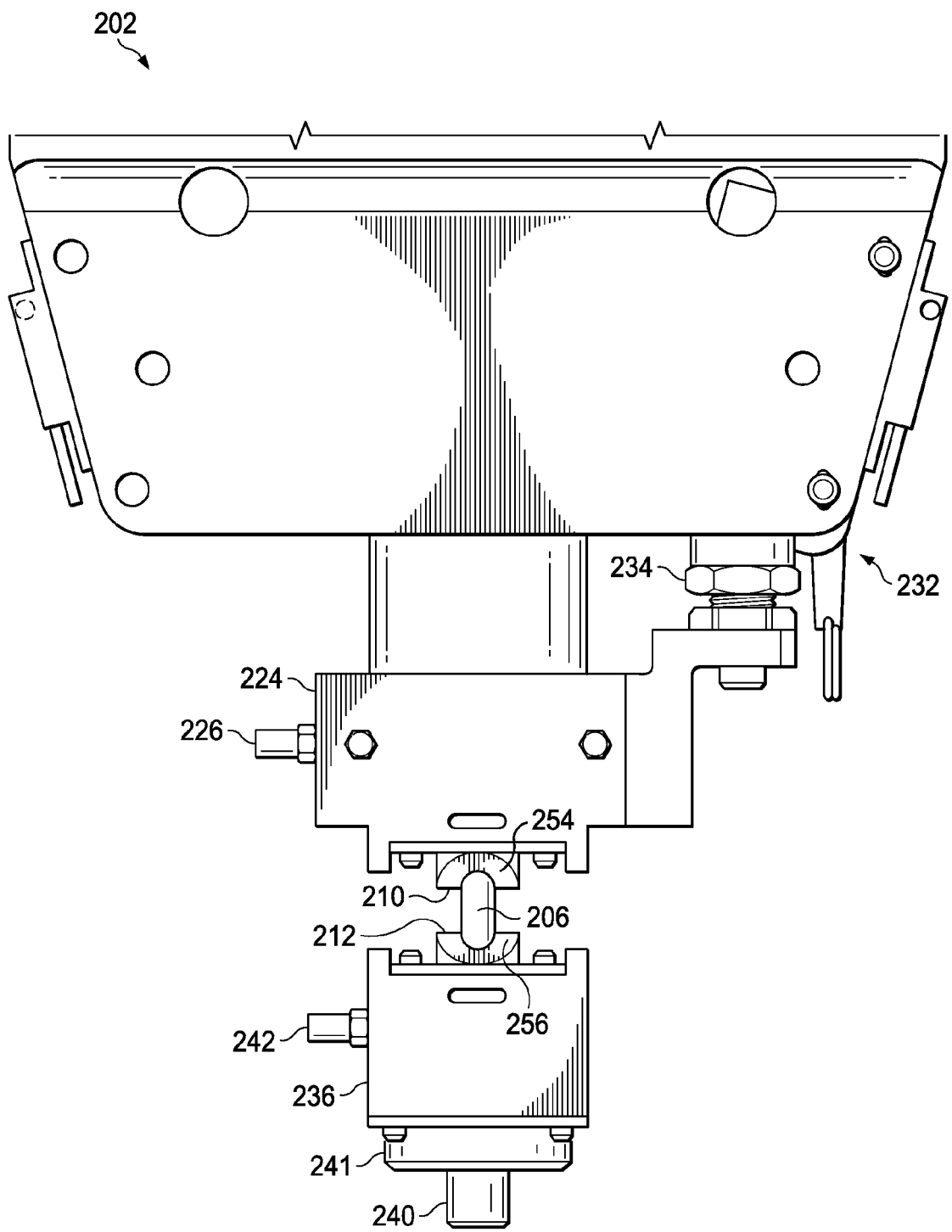
Figure 19:
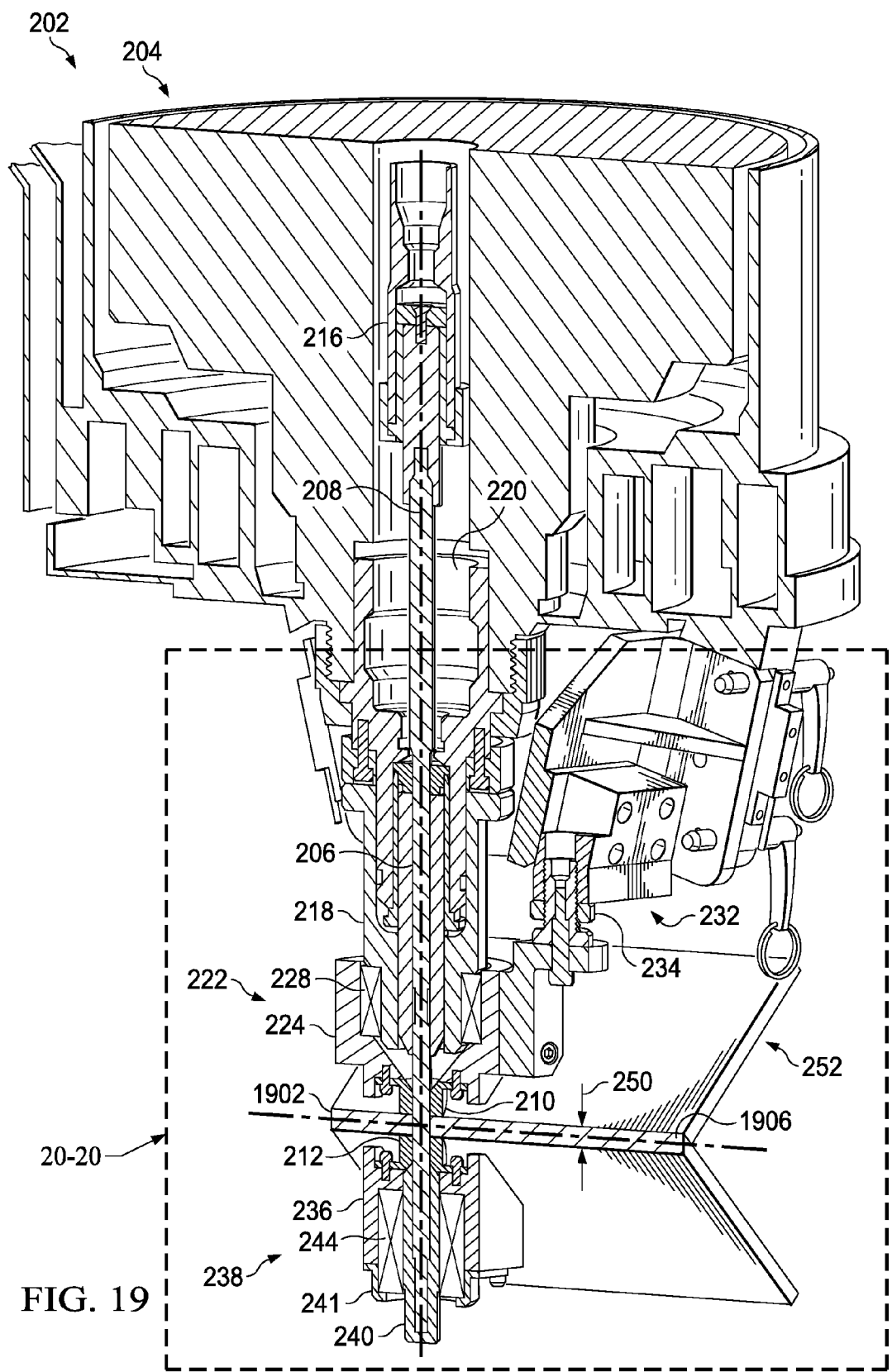
Figure 20:
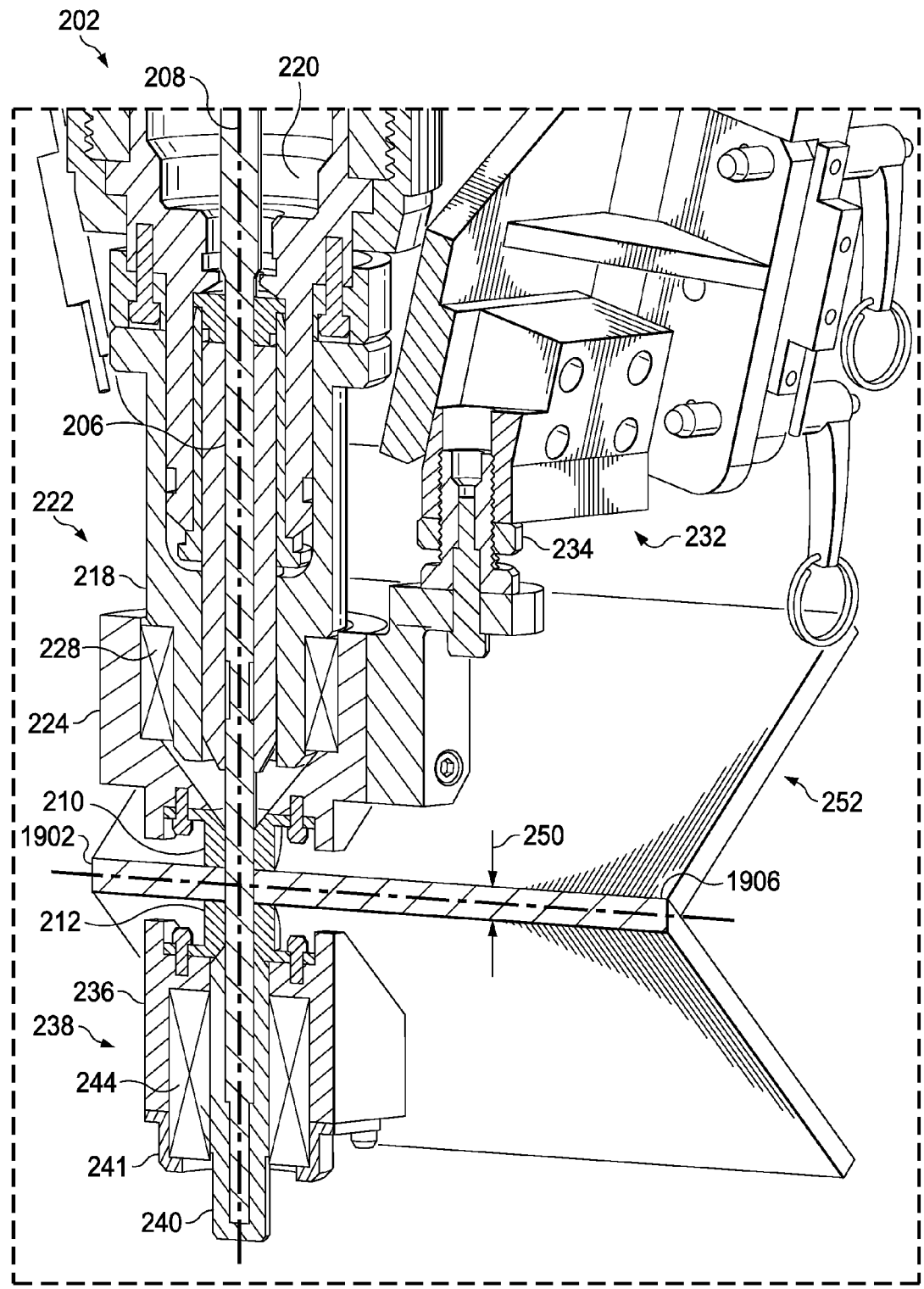
Figure 21:
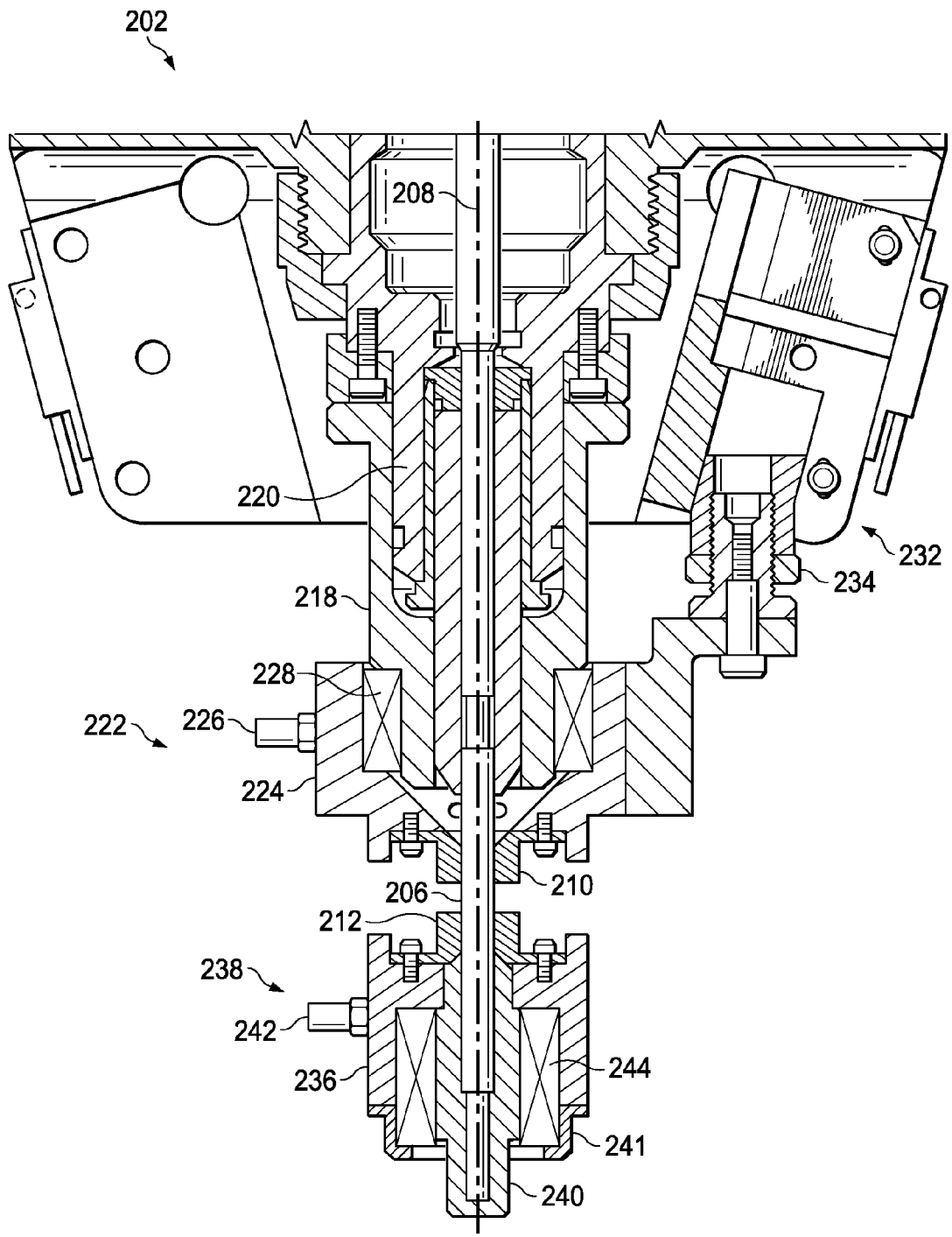
Figure 22:
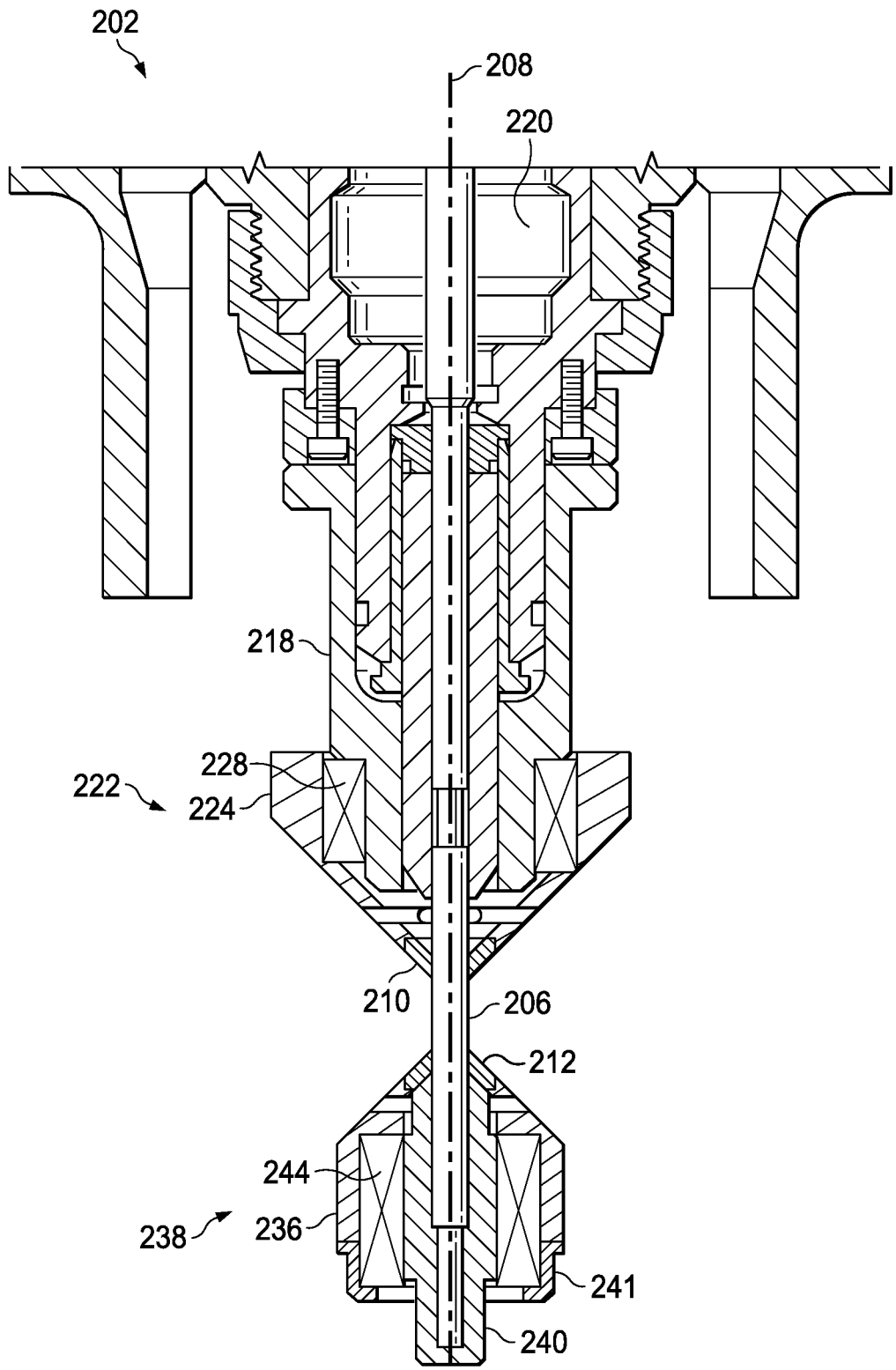
Figure 23:
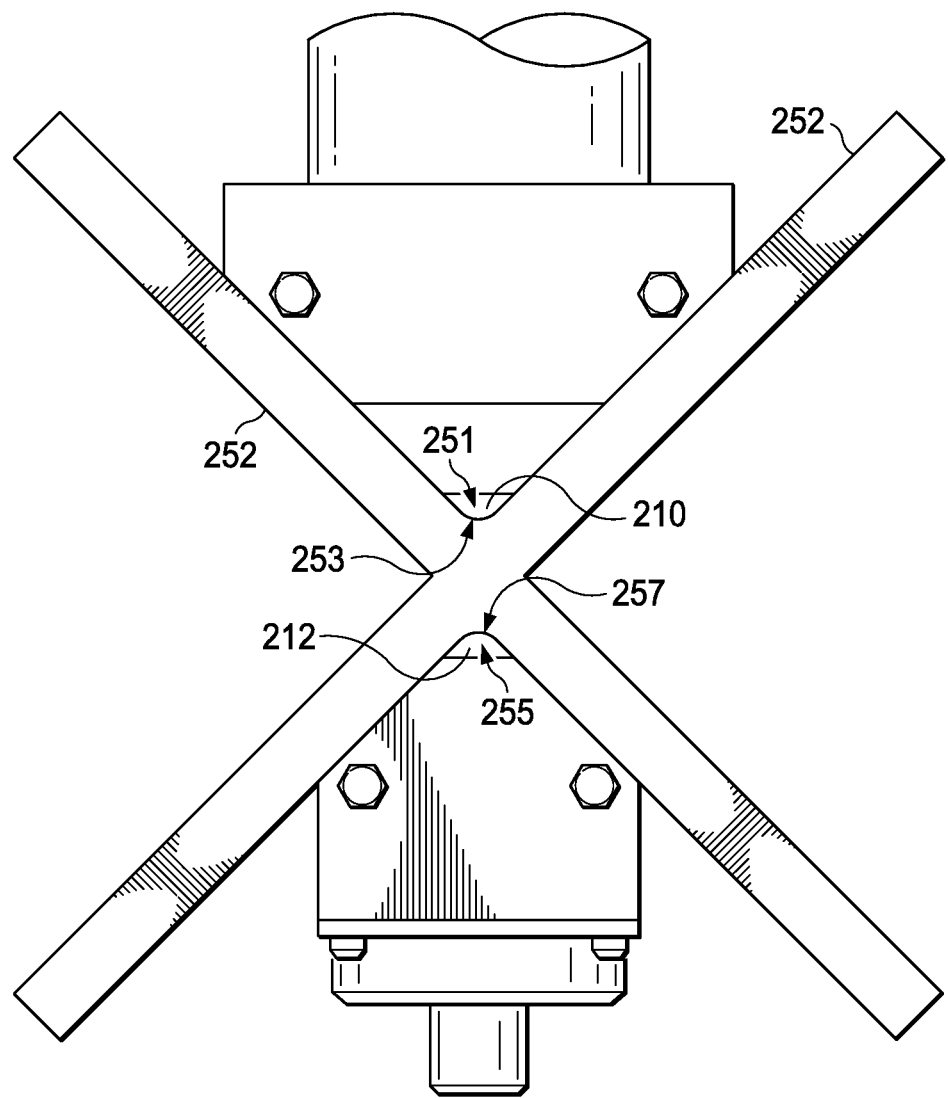
Figure 24:
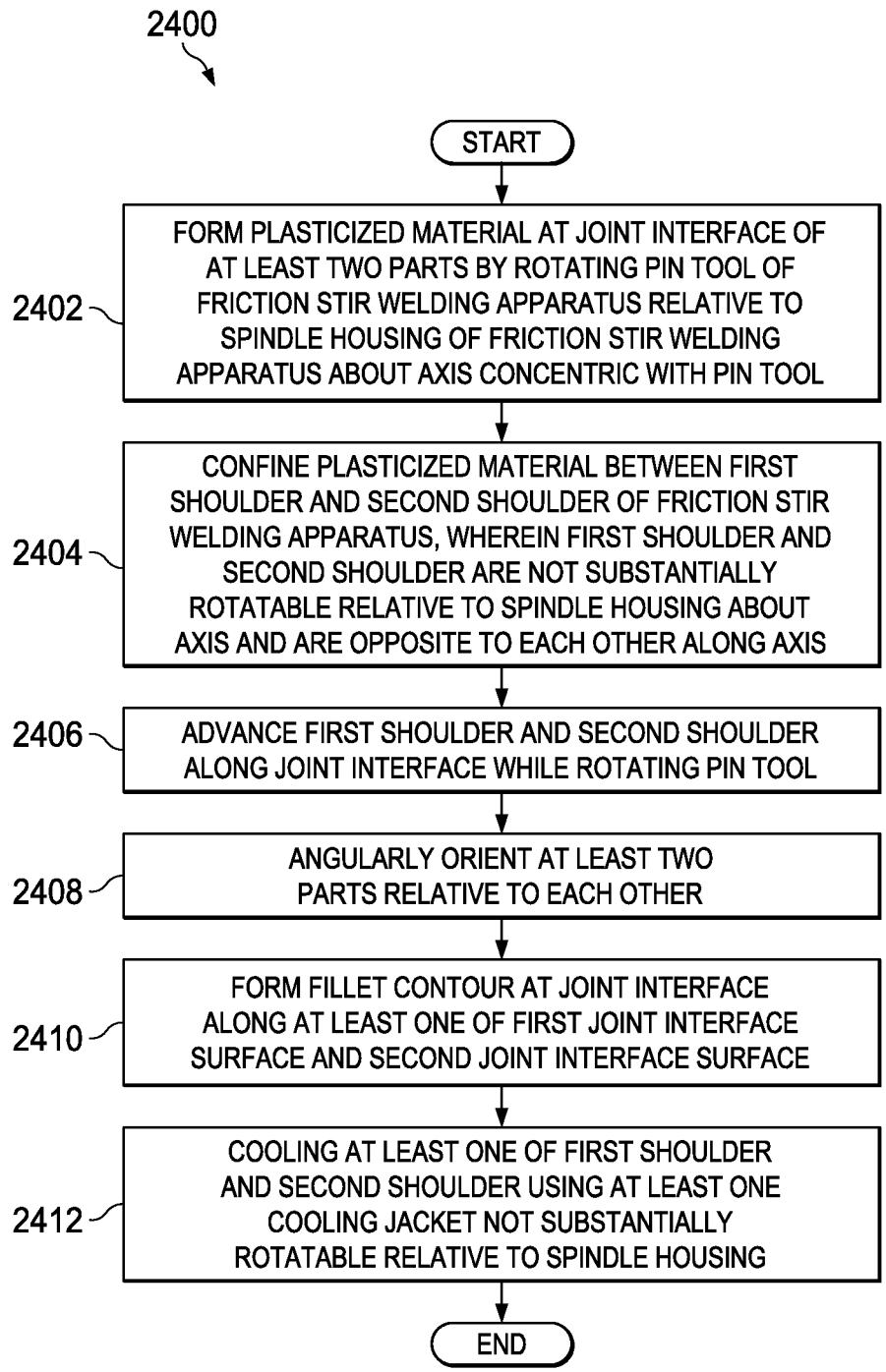
Figure 25:
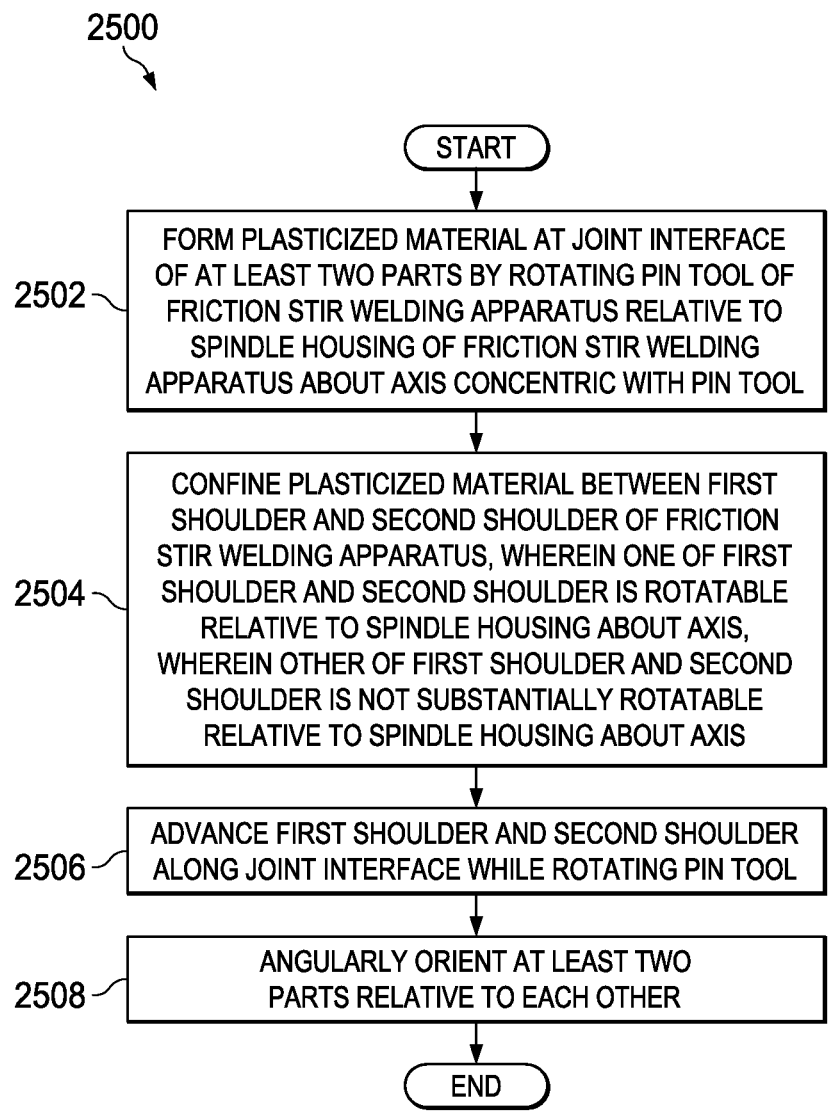

Having thus described examples of the disclosure in general terms, reference will now be made to the accompanying drawings, which are not necessarily drawn to scale, and wherein like reference characters designate the same or similar parts throughout the several views, and wherein:

FIG. 1 is an illustration of an aircraft in which an illustrative example of the disclosure may be implemented;

FIG. 2 is a block diagram illustrating a friction stir welding apparatus according to one aspect of the present disclosure;

FIG. 3 is a schematic illustration of a detailed front view of a first shoulder of a friction stir welding apparatus, such as shown, e.g., in FIGS. 2 and 14-23, according to one aspect of the present disclosure;

FIG. 4 is a detailed schematic illustration of a front view of a first shoulder of a friction stir welding apparatus, such as shown, e.g., in FIGS. 2 and 14-23, according to one aspect of the present disclosure;

FIG. 5 is a schematic illustration of a front view of at least two parts and a first shoulder and a second shoulder of a friction stir welding apparatus, such as shown, e.g., in FIGS. 2 and 14-23, according to one aspect of the present disclosure;

FIG. 6 is a schematic illustration of a front view of at least two parts and a first shoulder and a second shoulder of a friction stir welding apparatus, such as shown, e.g., in FIGS. 2 and 14-23, according to one aspect of the present disclosure;

FIG. 7 is a schematic illustration of a first shoulder and a second shoulder of a friction stir welding apparatus, such as shown, e.g., in FIGS. 2 and 14-23, according to one aspect of the present disclosure;

FIG. 8 is a schematic illustration of a first shoulder and a second shoulder of a friction stir welding apparatus, such as shown, e.g., in FIGS. 2 and 14-23, according to one aspect of the present disclosure;

FIG. 9 is a schematic illustration of a first shoulder and a second shoulder of a friction stir welding apparatus, such as shown, e.g., in FIGS. 2 and 14-23, according to one aspect of the present disclosure;

FIG. 10 is a schematic illustration of a first shoulder and a second shoulder of a friction stir welding apparatus, such as shown, e.g., in FIGS. 2 and 14-23, according to one aspect of the present disclosure;

FIG. 11 is a schematic illustration of a first shoulder and a second shoulder of a friction stir welding apparatus, such as shown, e.g., in FIGS. 2 and 14-23, according to one aspect of the present disclosure;

FIG. 12 is a schematic illustration of a first shoulder and a second shoulder of a friction stir welding apparatus, such as shown, e.g., in FIGS. 2 and 14-23, according to one aspect of the present disclosure;

FIG. 13 is a detailed schematic illustration of a front view of a first shoulder and a second shoulder of a friction stir welding apparatus, such as shown, e.g., in FIGS. 2 and 14-23, according to one aspect of the present disclosure;

FIG. 14 is a perspective view of a friction stir welding apparatus and at least two parts, such as shown, e.g., in FIGS. 2 and 15-23, according to one aspect of the present disclosure;

FIG. 15 is a detailed perspective view of a friction stir welding apparatus and at least two parts, such as shown, e.g., in FIGS. 2, 14, and 16-23, according to one aspect of the present disclosure;

FIG. 16 is a detailed perspective view of a friction stir welding apparatus, such as shown, e.g., in FIGS. 2, 14-15, and 17-23, according to one aspect of the present disclosure;

FIG. 17 is a detailed front view of a friction stir welding apparatus, such as shown, e.g., in FIGS. 2, 14-16, and 18-23, according to one aspect of the present disclosure;

FIG. 18 is a detailed side view of a friction stir welding apparatus, such as shown, e.g., in FIGS. 2, 14-17, and 19-23, according to one aspect of the present disclosure;

FIG. 19 is a cross-sectional perspective view of a friction stir welding apparatus, such as shown, e.g., in FIGS. 2, 14-18, and 20-23, according to one aspect of the present disclosure;

FIG. 20 is a detailed cross-sectional perspective view of a friction stir welding apparatus, such as shown, e.g., in FIGS. 2, 14-19, and 21-23, according to one aspect of the present disclosure;

FIG. 21 is a detailed cross-sectional side view of a friction stir welding apparatus, such as shown, e.g., in FIGS. 2, 14-20, and 22-23, according to one aspect of the present disclosure;

FIG. 22 is a detailed cross-sectional front view of a friction stir welding apparatus, such as shown, e.g., in FIGS. 2, 14-21, and 23, according to one aspect of the present disclosure;

FIG. 23 is a detailed cross-sectional side view of a friction stir welding apparatus, such as shown, e.g., in FIGS. 2 and 14-22, according to one aspect of the present disclosure;

FIG. 24 is a flowchart of a process for joining at least two parts using a friction stir welding apparatus, such as shown, e.g., in FIGS. 2 and 14-23, according to one aspect of the disclosure;

FIG. 25 is a flowchart of a process for joining at least two parts using a friction stir welding apparatus, such as shown, e.g., in FIGS. 2 and 14-23, according to one aspect of the disclosure;

FIG. 26 is a block diagram of an aircraft manufacturing and service method in accordance with an illustrative example; and FIG. 27 is a block diagram of an aircraft in which an illustrative example may be implemented.

In the block diagram(s) referred to above, solid lines connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagram(s) may also exist. Dashed lines, if any, connecting the various elements and/or components represent couplings similar in function and purpose to those represented by solid lines; however, couplings represented by the dashed lines are either selectively provided or relate to alternative or optional aspects of the disclosure. Likewise, any elements and/or components, represented with the dashed lines, indicate alternative or optional aspects of the disclosure. Environmental elements, if any, are represented with dotted lines.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

With reference now to the figures and, in particular, with reference to FIG. 1, an illustration of an aircraft is depicted in which an illustrative example may be implemented. In this illustrative example, an aircraft 100 has a wing 102 and a wing 104 attached to a body 106. The aircraft 100 includes an engine 108 attached to the wing 102 and an engine 110 attached to the wing 104.

The body 106 has a tail section 112. A horizontal stabilizer 114, a horizontal stabilizer 116, and a vertical stabilizer 118 are attached to the tail section 112 of the body 106.

The aircraft 100 is an example of an aircraft in which parts joined using an apparatus and methods shown or described herein may be used. For example, parts of the wing 102, the wing 104, or the body 106 may be joined using the apparatus and methods shown or described herein.

The illustration of the aircraft 100 in FIG. 1 is not meant to imply physical or architectural limitations to the manner in which an illustrative example may be implemented. For example, although the aircraft 100 is a commercial aircraft, the aircraft 100 may be a military aircraft, a rotorcraft, a helicopter, an unmanned aerial vehicle, or any other suitable aircraft.

Although the illustrative examples are described with respect to an aircraft, the apparatus and method may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

As illustrated, e.g., in FIGS. 2 and 16, one example of the present disclosure relates to a friction stir welding apparatus 202. The friction stir welding apparatus 202 includes a spindle housing 204 and a pin tool 206, concentric with an axis 208 and rotatable relative to the spindle housing 204 about the axis 208. The friction stir welding apparatus 202 also includes a first shoulder 210, not substantially rotatable relative to the spindle housing 204 about the axis 208, and a second shoulder 212, not substantially rotatable relative to the spindle housing 204 about the axis 208. The pin tool 206 is rotatable relative to the first shoulder 210 and the second shoulder 212.

The friction stir welding apparatus 202 may be configured to join at least two parts 252, which may have a variety of joint interface geometries. As used herein, a joint interface, such as a joint interface 250 of the at least two parts 252, is a portion of the at least two parts 252 in contact with the first shoulder 210 and the second shoulder 212 during a friction stir welding operation.

The pin tool 206 may be held by a pin holder 216 with no relative movement between the pin tool 206 and the pin holder 216. The pin holder 216 may be positioned within the spindle housing 204. The pin holder 216 may function to move the pin tool 206 along the axis 208. Further, the pin holder 216 may function to rotate the pin tool 206 about the axis 208.

The pin tool 206 may extend through a first structure 222 of the friction stir welding apparatus 202. The pin tool 206 may be rotatably connected to a second structure 238 of the friction stir welding apparatus 202.

The first structure 222 of the friction stir welding apparatus 202 may be connected to the spindle housing 204 such that the pin tool 206 may rotate relative to the spindle housing 204 while the first structure 222 does not rotate relative to the spindle housing 204. The first structure 222 of the friction stir welding apparatus 202 includes the first shoulder 210, a first cooling jacket 224, and at least one radial and thrust bearing 228. The first structure 222 may also include other components (not shown). For example, the first structure 222 may include fasteners, bearings, connectors, or other components.

The first shoulder 210 may contact a portion of the joint interface 250 of the at least two parts 252 during a friction stir welding operation. The first cooling jacket 224 may be thermally coupled to the first shoulder 210 and the at least one radial and thrust bearing 228. A cooling fluid within the interior of the first cooling jacket 224 may remove heat from at least one of the at least one radial and thrust bearing 228 and the first shoulder 210.

The at least one radial and thrust bearing 228 may be positioned between the first cooling jacket 224 and a structure adapter 218 to allow the structure adapter 218 to rotate relative to the first cooling jacket 224. The structure adapter 218 may rotate at substantially the same speed as the pin tool 206. Axial and lateral loads are transmitted from the pin tool 206 into the structure adapter 218 and further into the spindle housing 204.

The pin tool 206 may be rotatably connected to the second structure 238. The second structure 238 of the friction stir welding apparatus 202 includes the second shoulder 212, a second cooling jacket 236, and at least one radial and thrust bearing 244. The second structure 238 may also include other known elements (not shown). For example, the second structure 238 may include fasteners, bearings, connectors, or other known elements.

The second shoulder 212 may contact a portion of the joint interface 250 of the at least two parts 252 during a friction stir welding operation. The second cooling jacket 236 may be thermally coupled to at least one of the radial and thrust bearing 244 and the second shoulder 212. Specifically, in some examples, cooling fluid in the interior of the second cooling jacket 236 may remove heat from at least one of the at least one radial and thrust bearing 244 and the second shoulder 212. The at least one radial and thrust bearing 244 may take the form of an angular contact bearing, which may allow the pin tool 206 and a bobbin nut 240 to rotate independently of the second shoulder 212 and the second cooling jacket 236.

In one or more examples, the first shoulder 210 is not substantially rotatable relative to the spindle housing 204, as previously mentioned, because the first shoulder 210 is substantially restricted from rotation relative to the spindle housing 204 about the axis 208, e.g., by an anti-rotation device 232, described in detail below. Additionally or alternatively, in some examples, the first shoulder 210 may be substantially restricted from rotation relative to the spindle housing 204 by the joint interface geometry of the at least two parts 252. For example, the joint interface geometry of the at least two parts 252 relative to a shape of the first shoulder 210 may be such as to substantially restrict rotation of the first shoulder 210 relative to the at least two parts 252 and the spindle housing 204.

In one or more examples, the second shoulder 212 is not substantially rotatable relative to the spindle housing 204. The pin tool 206 may be rotatably coupled with the second shoulder 212 along the axis 208 via at least one radial and thrust bearing 244. One example of a radial and thrust bearing may include an angular contact bearing. The second shoulder 212 may be substantially restricted from rotation relative to the spindle housing 204 by the joint interface geometry of the at least two parts 252, while the pin tool 206 may rotate with respect to the spindle housing 204.

By substantially restricting rotation of one or both of the first shoulder 210 and the second shoulder 212 about the axis 208 according to one or more examples of the present disclosure, the friction stir welding apparatus 202 may be able to join the at least two parts 252 having a plurality of different joint interface configurations. As shown, for example, in FIGS. 5-10, the friction stir welding apparatus 202 (e.g., FIG. 16) may be able to join the at least two parts 252 having a first joint interface surface 258 and an opposing, second joint interface surface 260, one or both of which are non-planar.

In one aspect, the first joint interface surface 258 may be non-planar, but may include substantially planar portions. As shown, e.g., in FIGS. 5, 6, and 10, the substantially planar portions of the first joint interface surface 258 may be oriented at an angle 264 (which is greater than or less than 180 degrees) to each other. Additionally or alternatively, the second joint interface surface 260 may be non-planar, but may include substantially planar portions. As shown, e.g., in FIGS. 5, 6, and 10, the substantially planar portions of the second joint interface surface 260 may be oriented at an angle 265 (which is greater than or less than 180 degrees) to each other. In another aspect, at least one of the first joint interface surface 258 and the second joint interface surface 260 may be curved, as shown, e.g., in FIGS. 7-9.

As used herein, the phrase "at least one of," when used with a list of items, means different combinations of one or more of the listed items may be used and only one of each item in the list may be needed. For example, "at least one of item A, item B, or item C" may include, without limitation, item A or item A and item B. This example also may include item A, item B, and item C or item B and item C. The item may be a particular object, thing, or a category. In other words, at least one of means any combination of items and number of items may be used from the list but not all of the items in the list are required.

As illustrated, e.g., in FIGS. 2, 8, and 9 one example of the present disclosure relates to the friction stir welding apparatus 202. The friction stir welding apparatus includes the spindle housing 204 (illustrated, e.g., in FIG. 14) and the pin tool 206 concentric with the axis 208 and rotatable relative to the spindle housing 204 about the axis 208. The friction stir welding apparatus 202 also includes the first shoulder 210 and the second shoulder 212. One of the first shoulder 210 and the second shoulder 212 is rotatable relative to the spindle housing 204 about the axis 208. The other of the first shoulder 210 and the second shoulder 212 is not substantially rotatable relative to the spindle housing 204 about the axis 208.

In one aspect of the disclosure, illustrated, e.g., in FIG. 8, the second shoulder 212 may be configured to rotate when the second joint interface surface 260 is planar or substantially planar. In illustrative examples where second shoulder 212 is substantially rotatable relative to the spindle housing 204 (shown, e.g., in FIG. 16) about the axis 208, as in FIG. 8, second shoulder 212 may be rotatably coupled to the pin tool 206 and may be rotated by a drive provided to rotate second shoulder 212 relative to the spindle housing 204 about the axis 208. In other illustrative examples, second shoulder 212 may be coupled to pin tool 206 such that second shoulder 212 may be rotated by the rotation of pin tool 206 relative to spindle housing 204.

In one aspect of the disclosure, illustrated, e.g., in FIG. 9, the first shoulder 210 may be configured to rotate when the first shoulder 210 engages the first joint interface surface 258 of the at least two parts 252 and the first joint interface surface 258 is planar or substantially planar. When first shoulder 210 is substantially rotatable relative to the spindle housing 204 (shown, e.g., in FIG. 16) about the axis 208, as in FIG. 9, anti-rotation device 232 (illustrated, e.g., in FIG. 16) may not be present. Further, in these illustrative examples, first shoulder 210 may be rotatably coupled to the spindle housing 204.

In some illustrative examples, first shoulder 210 may be rotated by a drive provided to rotate first shoulder 210 relative to the spindle housing 204 about the axis 208. In other illustrative examples, first shoulder 210 may be rotated by the rotation of pin tool 206 relative to spindle housing 204. In yet other illustrative examples, first shoulder 210 may be connected to structure adapter 218 (shown, e.g., in FIG. 16). In these illustrative examples, first shoulder 210 may be rotated by the mechanism that rotates structure adapter 218.

As shown, e.g., in FIGS. 5-19, in one aspect of the disclosure, which may include at least a portion of the subject matter of any of the preceding and/or following examples and aspects, the pin tool 206 of the friction stir welding apparatus 202 is movable relative to the first shoulder 210 along the axis 208 and is fixed relative to the second shoulder 212 along the axis 208.

As depicted, e.g., in FIG. 16, the pin tool 206 may extend through a structure adapter 218, a structure holder 220, and the first structure 222. In some illustrative examples, the structure adapter 218 and the structure holder 220 may function to position and hold the first structure 222 relative to the spindle housing 204. In some examples, the structure adapter 218 and the structure holder 220 may physically couple the first structure 222 to the spindle housing 204.

The first structure 222 may not be movable relative to the spindle housing 204 along the axis 208. Thus, the pin tool 206 may move relative to the spindle housing 204 and the first shoulder 210 when the pin tool 206 moves along the axis 208.

The pin tool 206 may be rotatably coupled to the second structure 238, which includes the second shoulder 212. More specifically, the pin tool 206 may be fixed relative to a bobbin nut 240, which may be rotatably coupled to the second structure 238, e.g., via the at least one radial and thrust bearing 244. Since the pin tool 206 is fixed to the bobbin nut 240, as the pin tool 206 moves along the axis 208, the second shoulder 212 also moves along the axis 208.

In one aspect of the disclosure, which may include at least a portion of the subject matter of any of the preceding and/or following examples and aspects, the friction stir welding apparatus 202 also includes the first cooling jacket 224 thermally coupled to the first shoulder 210, and the second cooling jacket 236 thermally coupled to the second shoulder 212.

As shown in FIG. 2, the first cooling jacket 224 may include a fluid cooling port 226. A cooling device 230 is coupled to the first cooling jacket 224 via the fluid cooling port 226. The cooling device 230 may supply cooling fluid to the interior of the first cooling jacket 224, which is thermally coupled to at least the second shoulder 212, as indicated above. This cooling fluid may remove excessive heat from at least one of the radial and thrust bearing 228 and the first shoulder 210. Additionally or alternatively, another cooling device may be coupled to the first cooling jacket 224.

The second cooling jacket 236 may include a fluid cooling port 242. A cooling device 246 is coupled to the second cooling jacket 236 via the fluid cooling port 242. In some examples, the second cooling jacket 236 may be additionally or alternatively coupled to the cooling device 230. Accordingly, one or more cooling devices may supply cooling fluid to the interior of the second cooling jacket 236, which is thermally coupled to at least the second shoulder 212, as indicated above. This cooling fluid may remove excessive heat from at least one of the at least one radial and thrust bearing 244 and the second shoulder 212.

In one aspect of the disclosure, which may include at least a portion of the subject matter of any of the preceding and/or following examples and aspects, the first cooling jacket 224 and the second cooling jacket 236 of the friction stir welding apparatus 202 are not substantially rotatable relative to the spindle housing 204 about the axis 208.

In some illustrative examples, the first cooling jacket 224 may be directly coupled to the first shoulder 210. As a result, the first cooling jacket 224 and the first shoulder 210 may each be substantially restricted from rotating relative to the spindle housing 204 about the axis 208. As described above, the pin tool 206 may be rotatable relative to the first shoulder 210 and the first cooling jacket 224 about the axis 208.

In yet other illustrative examples, the first cooling jacket 224 may be substantially restricted from rotating relative to the spindle housing 204 about the axis 208 by the anti-rotation device 232 (illustrated, e.g., in FIG. 16). In some illustrative examples, the anti-rotation device 232 may be physically coupled to the first cooling jacket 224 of the first structure 222. The anti-rotation device 232 may also include a height adjustment device 234. The height adjustment device 234 may be used to adjust the height of the first cooling jacket 224.

In one or more examples, the second shoulder 212 is not substantially rotatable relative to the spindle housing 204. In some illustrative examples, the second cooling jacket 236 may be directly physically coupled to the second shoulder 212.

In some illustrative examples, the pin tool 206 may be rotatably coupled with the second cooling jacket 236 via the at least one radial and thrust bearing 244. One example of a radial and thrust bearing may include an angular contact bearing. As previously indicated, the second cooling jacket 236 may not be substantially rotatable relative to the spindle housing 204 about the axis 208. In some illustrative examples, an anti-rotation device may be physically coupled to the second cooling jacket 236 of the second structure 238.

Referring, e.g., to FIGS. 5, 6, and 10, in one aspect of the disclosure, which may include at least a portion of the subject matter of any of the preceding and/or following examples and aspects, the first shoulder 210 includes a first contact portion 254 and the second shoulder 212 includes a second contact portion 256 facing the first contact portion 254. The first contact portion 254 and the second contact portion 256 may be complementary to the first joint interface surface 258 and the second joint interface surface 260 of the joint interface 250, respectively. A shape 262 of the first contact portion 254 may influence the angle 264 of the first joint interface surface 258 of the at least two parts 252. A shape 266 of the second contact portion 256 may influence the angle 265 of the second joint interface surface 260 of the at least two parts 252.

In one illustrative example, the at least two parts 252 may form the joint interface 250 having the angle 264, which is not equal to 180 degrees. FIGS. 5 and 6 depict two illustrative examples of joint interface 250 having the angle 264, which is not equal to 180 degrees. FIG. 5 depicts an example of joint interface 250 having the angle 264 which is less than 180 degrees. FIG. 6 is an example of joint interface 250 having the angle 264 which is greater than 180 degrees.

In some illustrative examples, at least one of the first contact portion 254 and the second contact portion 256 is continuous. For example, in FIGS. 7-9, both the first contact portion 254 and the second contact portion 256 are continuous.

In one aspect of the disclosure, which may include at least a portion of the subject matter of any of the preceding and/or following examples and aspects, at least one of the first contact portion 254 and the second contact portion 256 is discontinuous. As shown in FIGS. 3 and 4, the first contact portion 254 may be discontinuous due to a third contact portion 268 being interposed between the two surfaces of the first contact portion 254. As shown in FIGS. 6 and 10, the second contact portion 256 may be discontinuous due to a fourth contact portion 270 being interposed between the two surfaces of the second contact portion 256.

FIG. 3 is an illustration of a detailed front view of a first shoulder of a friction stir welding apparatus, according to one aspect of the present disclosure. Specifically, FIG. 3 is a front view of the first shoulder 210 of the friction stir welding apparatus 202 (illustrated, e.g., in FIGS. 2 and 16). As depicted, the first shoulder 210 has the first contact portion 254 and the third contact portion 268. The first contact portion 254 includes discontinuous surfaces. Specifically, surfaces of the first contact portion 254 are separated by the third contact portion 268. In this illustrated example, the third contact portion 268 is a smoothly contoured or radiused surface. The radius of the third contact portion 268 influences a fillet contour of a friction-stir-welded joint produced by the first shoulder 210.

Referring, e.g., to FIGS. 5 and 6, in one aspect of the disclosure, which may include at least a portion of the subject matter of any of the preceding and/or following examples and aspects, at least a part of one of the first contact portion 254 and the second contact portion 256 is non-planar. Where each of the angles 264 and 265 is not equal to 180 degrees, the first contact portion 254 and the second contact portion 256 are non-planar. FIGS. 5 and 6 depict two illustrative examples in which the first contact portion 254 and the second contact portion 256 are non-planar.

In one aspect of the disclosure, which may include at least a portion of the subject matter of any of the preceding and/or following examples and aspects, the first contact portion 254 and the second contact portion 256 are mutually complementary. As used herein, surfaces are mutually complementary when the surfaces are substantial inverses of each other. For example, the first contact portion 254 may be a convex surface while the second contact portion 256 may be a mutually complementary concave surface. FIG. 6 depicts an illustrative example in which the first contact portion 254 and the second contact portion 256 are mutually complementary.

FIG. 6 is a schematic front view of at least two parts and a first shoulder and a second shoulder of a friction stir welding apparatus, according to one aspect of the present disclosure. Specifically, the first shoulder 210 and the second shoulder 212 of the friction stir welding apparatus 202 (illustrated, e.g., in FIG. 16) are depicted relative to opposite surfaces of the at least two parts 252. The pin tool 206 extends through the first shoulder 210, second shoulder 212, and the at least two parts 252. During a welding operation, the first contact portion 254 of the first shoulder 210 is urged against the first joint interface surface 258 of the at least two parts 252. The second contact portion 256 of the second shoulder 212 is urged against the second joint interface surface 260 of the at least two parts 252. As a result, the shape 262 of the first contact portion 254 is selected based on the angle 264 of the at least two parts 252. Further, the shape 266 of the second contact portion 256 is selected based on the angle 265 of the at least two parts 252.

As depicted, the first contact portion 254 is concave and the first joint interface surface 258 is convex. The second contact portion 256 is convex and the second joint interface surface 260 is concave. As depicted, the angle 264 and the angle 265 sum to approximately 360 degrees. As a result, the first contact portion 254 and the second contact portion 256 are mutually complementary.

In one aspect of the disclosure, which may include at least a portion of the subject matter of any of the preceding and/or following examples and aspects, the first contact portion 254 and the second contact portion 256 are mutually symmetric. As used herein, surfaces are mutually symmetric when surfaces have reflection symmetry about a plane. FIG. 5 depicts an illustrative example in which the first contact portion 254 and the second contact portion 256 are mutually symmetric.

FIG. 5 is a detailed schematic front view of at least two parts and a first shoulder and a second shoulder of a friction stir welding apparatus, according to one aspect of the present disclosure. Specifically, the first shoulder 210 and the second shoulder 212 of the friction stir welding apparatus 202 (illustrated, e.g., in FIG. 16) are depicted relative to opposite surfaces of the at least two parts 252. The pin tool 206 extends through the first shoulder 210, second shoulder 212, and the at least two parts 252. During a welding operation, the first contact portion 254 of the first shoulder 210 is urged against the first joint interface surface 258 of the at least two parts 252. The second contact portion 256 of the second shoulder 212 is urged against the second joint interface surface 260 of the at least two parts 252. As a result, the shape 262 of the first contact portion 254 is selected based on the angle 264 of the first joint interface surface 258 of the at least two parts 252 and the shape 266 of the second contact portion 256 is selected based on the angle 265 of the second joint interface surface 260. The first contact portion 254 is convex and the first joint interface surface 258 is concave. The second contact portion 256 is convex and the second joint interface surface 260 is concave. As depicted, the angle 264 is substantially the same as the angle 265. Accordingly, the first contact portion 254 and the second contact portion 256 are substantially mutually symmetric.

In one aspect of the disclosure, which may include at least a portion of the subject matter of any of the preceding and/or following examples and aspects, the first contact portion 254 has a shape different from that of the second contact portion 256. FIGS. 6 and 8 depict illustrative examples in which the first contact portion 254 has a shape different from that of the second contact portion 256.

In one aspect of the disclosure, which may include at least a portion of the subject matter of any of the preceding and/or following examples and aspects, the first shoulder 210 further includes the third contact portion 268 (illustrated, e.g., in FIG. 3), and the second shoulder 212 further includes the fourth contact portion 270 (illustrated, e.g., in FIG. 10) opposite the third contact portion 268. With reference, e.g., to FIG. 2, the third contact portion 268 and the fourth contact portion 270 may contact the at least two parts 252 at the joint interface 250. The third contact portion 268 may have a shape 272. The shape 272 may be selected to form a fillet contour 255 in the joint interface 250 of a desired shape. As used herein, a fillet contour is a shape of material in the joint which was plasticized during welding. In some examples, the fillet contour 255 may be a fillet radius 257.

The fourth contact portion 270 may have a shape 274. The shape 274 may be selected to form a fillet contour 251 in the joint interface 250 of a desired shape. In some examples, the fillet contour 251 may be a fillet radius 253.

In one aspect of the disclosure, which may include at least a portion of the subject matter of any of the preceding and/or following examples and aspects, at least one of the third contact portion 268 and the fourth contact portion 270 is non-planar. FIG. 3 illustrates an example in which at least one of the third contact portion 268 and the fourth contact portion 270 is non-planar.

In one aspect of the disclosure, which may include at least a portion of the subject matter of any of the preceding and/or following examples and aspects, the third contact portion 268 and the fourth contact portion 270 are mutually symmetric. FIG. 11 depicts an example in which the third contact portion 268 and the fourth contact portion 270 are mutually symmetric.

FIG. 11 is a schematic front view of at least two parts and a first shoulder and a second shoulder of a friction stir welding apparatus, according to one aspect of the present disclosure. The pin tool 206 extends through the first shoulder 210, second shoulder 212, and the at least two parts 252. As depicted, the third contact portion 268 of the first shoulder 210 is contoured or radiused. As depicted, the fourth contact portion 270 of the second shoulder 212 is contoured or radiused. Further, the third contact portion 268 and the fourth contact portion 270 are mutually symmetric.

In one aspect of the disclosure, which may include at least a portion of the subject matter of any of the preceding and/or following examples and aspects, the third contact portion 268 has a shape different from that of the fourth contact portion 270. FIG. 12 depicts an illustrative example, in which the third contact portion 268 has a shape different from that of the fourth contact portion 270.

FIG. 12 is a schematic front view of at least two parts and a first shoulder and a second shoulder of a friction stir welding apparatus, according to one aspect of the present disclosure. The pin tool 206 extends through the first shoulder 210, second shoulder 212, and the at least two parts 252. As depicted, the fourth contact portion 270 of the second shoulder 212 is planar. As the second shoulder 212 is planar, second shoulder 212 may be rotatable relative to the spindle housing about the axis.

In one aspect of the disclosure, which may include at least a portion of the subject matter of any of the preceding and/or following examples and aspects, at least one of the third contact portion 268 and the fourth contact portion 270 forms an edge. Figures such as 4-6 depict illustrative examples in which at least one of the third contact portion 268 and the fourth contact portion 270 form an edge.

FIG. 4 is a detailed schematic front view of a first shoulder of a friction stir welding apparatus, according to one aspect of the present disclosure. Specifically, FIG. 4 is a front view of the first shoulder 210 of the friction stir welding apparatus 202 (illustrated, e.g., in FIG. 16). As depicted, the first shoulder 210 has the first contact portion 254 and the third contact portion 268. The first contact portion 254 includes discontinuous surfaces. Specifically, surfaces of the first contact portion 254 are separated by the third contact portion 268. In this illustrated example, the third contact portion 268 forms an edge. As previously indicated, the contour of the third contact portion 268 influences the fillet contour of a resulting joint.

FIG. 10 is a schematic illustration of a first shoulder and a second shoulder of a friction stir welding apparatus, according to one aspect of the present disclosure. The pin tool 206 extends through the first shoulder 210, second shoulder 212, and the at least two parts 252. As depicted, the third contact portion 268 of the first shoulder 210 forms an edge. As depicted, the fourth contact portion 270 of the second shoulder 212 forms an edge.

In another example shown in FIG. 13, one of the third contact portion 268 and the fourth contact portion 270 may have a planar shape. FIG. 13 is detailed schematic front view of a first shoulder and a second shoulder of a friction stir welding apparatus, according to one aspect of the present disclosure. Specifically, FIG. 13 is a front view of the first shoulder 210 of the friction stir welding apparatus 202 (illustrated, e.g., in FIG. 16). As depicted, the first shoulder 210 has the first contact portion 254 and the third contact portion 268. The first contact portion 254 includes discontinuous surfaces. Specifically, surfaces of the first contact portion 254 are separated by the third contact portion 268. As depicted, the third contact portion 268 has a planar shape.

As depicted, the second shoulder 212 has the second contact portion 256 and the fourth contact portion 270. The third contact portion 268 includes discontinuous surfaces. Specifically, surfaces of the second contact portion 256 are separated by the fourth contact portion 270. As depicted, the fourth contact portion 270 has a planar shape.

Turning now to the remaining figures, FIGS. 14-23 depict a physical implementation of the friction stir welding apparatus 202. FIG. 14 is an illustration of a perspective view of a friction stir welding apparatus and at least two parts, according to one aspect of the present disclosure. FIG. 14 shows the friction stir welding apparatus 202 of FIG. 2. The spindle housing 204 is associated with the first structure 222. The at least two parts 252 can also be seen.

FIG. 15 is an illustration of a detailed perspective view of a friction stir welding apparatus and at least two parts, according to one aspect of the present disclosure. Specifically, FIG. 15 is a view of a detail 15-15 of FIG. 14. As can be seen in FIG. 15, the at least two parts 252 have the joint interface 250. The at least two parts 252 have the first joint interface surface 258 and the second joint interface surface 260. The first joint interface surface 258 is on an opposite side of the joint interface 250 than the second joint interface surface 260.

The friction stir welding apparatus 202 is positioned such that the first structure 222 associated with the first joint interface surface 258. The second structure 238 is associated with the second joint interface surface 260.

FIG. 16 is an illustration of a detailed perspective view of a friction stir welding apparatus, according to one aspect of the present disclosure. The at least two parts 252 are not shown. As depicted, the anti-rotation device 232 is associated with the first structure 222. The anti-rotation device 232 may prevent or restrict rotation of the first structure 222 including the first cooling jacket 224 and the first shoulder 210. The anti-rotation device 232 includes the height adjustment device 234. In this example, the anti-rotation device is directly coupled to the first cooling jacket 224. In some illustrative examples, the anti-rotation device 232 may not include the height adjustment device 234. Yet further, in some illustrative examples, the anti-rotation device 232 may be coupled to the first structure 222 using a different coupling mechanism. In other illustrative examples, the anti-rotation device 232 may not be present.

The second structure 238 includes the second shoulder 212, the second cooling jacket 236, a cover 241, and the bobbin nut 240. The bobbin nut 240 may be fixed to the end of the pin tool 206.

FIG. 17 is an illustration of a detailed front view of a friction stir welding apparatus, according to one aspect of the present disclosure. Specifically, FIG. 17 is a front view of the friction stir welding apparatus 202 of FIG. 16. As depicted, the first shoulder 210 has the first contact portion 254 and the third contact portion 268. The second shoulder 212 has the second contact portion 256 and the fourth contact portion 270. The first contact portion 254 is opposite the second contact portion 256. The first contact portion 254 may contact the first joint interface surface 258 of the at least two parts 252

(not shown) during processing. As depicted, the first contact portion 254 is a discontinuous surface which is separated by the third contact portion 268. The third contact portion 268, as depicted, forms a smoothly contoured or radiused surface. The third contact portion 268 is opposite the fourth contact portion 270.

The second contact portion 256 may contact the second joint interface surface 260 of the at least two parts 252 (not depicted) during processing. As depicted, the second contact portion 256 is a discontinuous surface which is separated by the fourth contact portion 270. The fourth contact portion 270, as depicted, forms a smoothly contoured or radiused surface.

As depicted, the first cooling jacket 224 has a shape 1702. The second cooling jacket 236 has a shape 1704. The shape 1702 may be affected by the shape of the at least two parts 252 (illustrated, e.g., in FIG. 12). Specifically, the shape 1702 may be selected such that the first structure 222 may be positioned relative to the at least two parts 252 to join the at least two parts 252. The shape 1704 may be selected such that the second structure 238 may be positioned proximate to the at least two parts 252 to join the at least two parts 252.

FIG. 18 is an illustration of a detailed side view of a friction stir welding apparatus, according to one aspect of the present disclosure. Specifically, FIG. 18 is a side view of the friction stir welding apparatus 202 of FIG. 17. In this view, the fluid cooling port 226 is associated with the first cooling jacket 224. Further, the fluid cooling port 242 is associated with the second cooling jacket 236.

FIG. 19 is an illustration of a cross-sectional perspective view of a friction stir welding apparatus and at least two parts, according to one aspect of the present disclosure. Specifically, FIG. 19 is a perspective view of the friction stir welding apparatus 202 and the at least two parts 252 of FIG. 12. FIG. 19 is a section along the joint interface 250.

As can be seen in FIG. 19, the first structure 222 is connected to the spindle housing 204 through a variety of parts. Specifically, the first structure 222 is connected to the spindle housing 204 through the structure adapter 218 and the structure holder 220. The structure holder 220 may be joined to the spindle housing 204 and the structure adapter 218. The structure adapter 218 is positioned between the first structure 222 and the structure holder 220.

As depicted, the pin tool 206 includes the pin holder 216 and the pin tool 206. The pin tool 206 extends through the spindle housing 204, the first structure 222, and the second structure 238. As depicted, the friction stir welding apparatus 202 is in the middle of a joining operation. Before the start of the joining operation, the friction stir welding apparatus 202 is positioned next to, e.g., an edge 1902 of the joint interface 250 of the at least two parts 252. The pin tool 206 is then rotated and translated toward the joint interface 250. Once the rotating pin tool 206 begins to plasticize the joint interface 250, the second structure 238 is moved along the axis 208 until the joint interface 250 is clamped between the first structure 222 and the second structure 238, and more specifically, between the first shoulder 210 and the second shoulder 212. Moving the second structure 238 along the axis 208 may be accomplished by moving the pin tool 206 using the pin holder 216.

As the pin tool 206 rotates, the friction stir welding apparatus 202 may be advanced along the joint interface 250. Specifically, the friction stir welding apparatus 202 may be moved along an axis 1906.

FIG. 20 is an illustration of a detailed cross-sectional perspective view of a friction stir welding apparatus and at least two parts, according to one aspect of the present disclosure. Specifically, FIG. 20 is a view of a detail 20-20 of FIG. 19.

In this illustrative example, various bearings can be seen. For example, the at least one radial and thrust bearing 228 of the first structure 222 is depicted in FIG. 20. The at least one radial and thrust bearing 228 may transmit a load from the first structure 222 into the structure adapter 218 and into the spindle housing 204. The second structure 238 has the at least one radial and thrust bearing 244. The at least one radial and thrust bearing 244 may allow the pin tool 206 and the bobbin nut 240 to rotate relative to the second shoulder 212 and the second cooling jacket 236. In other words, the pin tool 206 may rotate about the axis 208 without rotating the second shoulder 212 and the second cooling jacket 236 about the axis 208. The at least two parts 252 may be clamped between the first shoulder 210 and the second shoulder 212.

FIG. 21 is an illustrative of a detailed cross-sectional side view of a friction stir welding apparatus, according to one aspect of the present disclosure. Specifically, FIG. 21 is a cross-sectional side view of friction stir welding apparatus 202 of FIG. 20.

FIG. 22 is an illustration of a detailed cross-sectional front view of a friction stir welding apparatus, according to one aspect of the present disclosure. Specifically, FIG. 22 is a cross-sectional front view of friction stir welding apparatus 202 of FIG. 21.

FIGS. 14-23 illustrate the friction stir welding apparatus 202 in which the first shoulder 210 and second shoulder 212 are not substantially rotatable relative to the spindle housing 204 about the axis 208. The illustrations of the friction stir welding apparatus 202 in FIGS. 14-23 are not meant to imply physical or architectural limitations to the manner in which an illustrative embodiment may be implemented. Other components in addition to or in place of the ones illustrated may be used. Some components may be unnecessary.

For example, although at least one radial and thrust bearing 228 is depicted in FIGS. 14-23, at least one radial and thrust bearing 228 may not be present in some illustrative examples. In these illustrative examples, alternatives to at least one radial and thrust bearing 228 may be present. For example, first structure 222 may be non-rotatably coupled to the spindle housing 204.

In other illustrative examples, first shoulder 210 may be rotatably coupled to first cooling jacket 224. In yet other illustrative examples, first cooling jacket 224 may not be present in friction stir welding apparatus 202.

In illustrative examples in which one of first shoulder 210 and second shoulder 212 is substantially rotatable relative to the spindle housing 204 about the axis 208, such as FIGS. 8 and 9, some previously described components may be used and other components may be unnecessary. For example, in illustrative examples in which first shoulder 210 is substantially rotatable relative to the spindle housing 204 about the axis 208, as in FIG. 9, anti-rotation device 232 may not be present. Further, in these illustrative examples, first shoulder 210 may be rotatably coupled to the spindle housing 204. In some illustrative examples, first shoulder 210 may be rotated by a drive provided to rotate first shoulder 210 relative to the spindle housing 204 about the axis. In other illustrative examples, first shoulder 210 may be coupled to and rotated by the pin tool 206 relative to spindle housing 204.

In illustrative examples in which the second shoulder 212 is rotatable relative to the spindle housing 204 about the axis 208, as in FIG. 8, the second shoulder 212 may be fixed to the pin tool 206. In these examples, the second shoulder 212 may be rotated by the pin tool 206 relative to spindle housing 204. In other illustrative examples, the second shoulder 212 may be rotated by a drive provided to rotate second shoulder 212 relative to the spindle housing 204 about the axis 208.

Referring primarily to FIG. 24, one example of the present disclosure relates to a method of joining the at least two parts 252. The method includes forming plasticized material at the joint interface 250 of the at least two parts 252 by rotating the pin tool 206 of the friction stir welding apparatus 202 relative to the spindle housing 204 of the friction stir welding apparatus 202 about the axis 208 concentric with the pin tool 206 (operation 2402); and confining the plasticized material between the first shoulder 210 and the second shoulder 212 of the friction stir welding apparatus 202. The first shoulder 210 and the second shoulder 212 are opposite to each other along the axis and are not substantially rotatable relative to the spindle housing 204 about the axis (operation 2404). The first shoulder 210 and the second shoulder 212 may confine the plasticized material based on the distance between the first shoulder 210 and the second shoulder 212. The first shoulder 210 and the second shoulder 212 may further confine the plasticized material based on a shape of at least one of the first shoulder 210 and the second shoulder 212.

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Additionally, in some aspects of the disclosure, not all operations described herein need be performed.

In one aspect of the disclosure, which may include at least a portion of the subject matter of any of the preceding and/or following examples and aspects, the method 2400 also includes advancing the first shoulder 210 and the second shoulder 212 along the joint interface 250 while rotating the pin tool 206 (operation 2406). By advancing the first shoulder 210 and the second shoulder 212 along the joint interface 250 while rotating the pin tool 206, a joint may be formed along the length of the joint interface 250. By rotating the pin tool 206 as the pin tool 206 is advanced along the joint interface 250, the material of the at least two parts 252 along the length of the joint interface may be plasticized to form the joint.

In one aspect of the disclosure, which may include at least a portion of the subject matter of any of the preceding and/or following examples and aspects, the axis 208 is a first axis and the joint interface 250 is disposed along a second axis (e.g., axis 1906, illustrated in FIGS. 19 and 20) substantially perpendicular to the first axis.

In one aspect of the disclosure, which may include at least a portion of the subject matter of any of the preceding and/or following examples and aspects, the method 2400 also includes angularly orienting the at least two parts 252 relative to each other (operation 2408). In some illustrative examples, the at least two parts 252 may be positioned at approximately 180 degrees relative to each other. In other illustrative examples, at least one of the angle 264 and the angle 265 formed by angularly orienting the at least two parts 252 may be less than 180 degrees. In other illustrative examples, the at least one of the angle 264 and the angle 265 formed by angularly orienting the at least two parts 252 may be greater than 180 degrees.

In one aspect of the disclosure, which may include at least a portion of the subject matter of any of the preceding and/or following examples and aspects, the at least two parts include a first joint interface surface 258 on one side of the joint interface 250 and a second joint interface surface 260 on an opposite side of the joint interface 250. In one aspect of the disclosure, which may include at least a portion of the subject matter of any of the preceding and/or following examples and aspects, the first joint interface surface 258 has a shape different from that of the second joint interface surface 260, as shown, for example, in FIGS. 6, 8, and 9.

In one aspect of the disclosure, which may include at least a portion of the subject matter of any of the preceding and/or following examples and aspects, the method 2400 also includes forming the fillet contour 251 (e.g. in FIG. 23) at the joint interface 250 along at least one of the first joint interface surface 258 and the second joint interface surface 260 (operation 2410). In one aspect of the disclosure, which may include at least a portion of the subject matter of any of the preceding and/or following examples and aspects, the fillet contour 251 is the fillet radius 253. In one aspect of the disclosure, which may include at least a portion of the subject matter of any of the preceding and/or following examples and aspects, the fillet radius 253 is substantially zero. Such a fillet radius may be associated with a third contact portion 268 and/or a fourth contact portion 270 forming an edge, as illustrated, e.g., in FIG. 4.

In one aspect of the disclosure, which may include at least a portion of the subject matter of any of the preceding and/or following examples and aspects, the first shoulder 210 includes the first contact portion 254 complementary to the first joint interface surface 258, the second shoulder 212 includes the second contact portion 256 facing the first contact portion 254 complementary to the second joint interface surface 260 and facing the first contact portion 254, the first shoulder 210 includes the third contact portion 268, and the second shoulder 212 includes the fourth contact portion 270 facing the third contact portion 268. The method 2400 also includes advancing the friction stir welding apparatus 202 along the joint interface 250 while rotating the pin tool 206, wherein at least one of the third contact portion 268 and the fourth contact portion 270 form the fillet contour 251 at the joint interface 250 along at least one of the first joint interface surface 258 and the second joint interface surface 260.

In one aspect of the disclosure, which may include at least a portion of the subject matter of any of the preceding and/or following examples and aspects, the method 2400 also includes cooling at least one of the first shoulder 210 and the second shoulder 212 using at least one cooling jacket (224 or 236) not substantially rotatable relative to the spindle housing 204 (operation 2412).

Referring primarily to FIG. 25, one example of the present disclosure relates to a method of joining at least two parts. The method includes forming plasticized material at the joint interface 250 of the at least two parts 252 by rotating the pin tool 206 of the friction stir welding apparatus 202 relative to the spindle housing 204 of the friction stir welding apparatus 202 about the axis 208 concentric with the pin tool 206 (operation 2502); and confining the plasticized material between the first shoulder 210 and the second shoulder 212 of the friction stir welding apparatus 202. One of the first shoulder 210 and the second shoulder 212 is rotatable relative to the spindle housing 204 about the axis 208. Another of the first shoulder 210 and the second shoulder 212 is not substantially rotatable relative to the spindle housing 204 about the axis 208 (operation 2504).

In one aspect of the disclosure, which may include at least a portion of the subject matter of any of the preceding and/or following examples and aspects, the method 2500 also includes advancing the first shoulder 210 and the second shoulder 212 along the joint interface 250 while rotating the pin tool 206 (operation 2506). By advancing the first shoulder 210 and the second shoulder 212 along the joint interface 250 while rotating the pin tool 206, a joint may be formed along the length of the joint interface 250. By rotating the pin tool 206 as the pin tool 206 is advanced along the joint interface 250, the material of the at least two parts 252 along the length of the joint interface may be plasticized to form the joint.

In one aspect of the disclosure, which may include at least a portion of the subject matter of any of the preceding and/or following examples and aspects, the method 2500 also includes angularly orienting the at least two parts relative to each other (operation 2508). In some illustrative examples, the at least two parts 252 may be positioned at approximately 180 degrees relative to each other. In other illustrative examples, at least one of the angle 264 and the angle 265 formed by angularly orienting the at least two parts 252 may be less than 180 degrees. In other illustrative examples, at least one of the angle 264 and the angle 265 formed by angularly orienting the at least two parts 252 may be greater than 180 degrees.

In one aspect of the disclosure, which may include at least a portion of the subject matter of any of the preceding and/or following examples and aspects, the at least two parts include the first joint interface surface 258 on one side of the joint interface 250 and the second joint interface surface 260 on an opposite side of the joint interface 250. In one aspect of the disclosure, which may include at least a portion of the subject matter of any of the preceding and/or following examples and aspects, the first joint interface surface 258 has a shape different from that of the second joint interface surface 260. In illustrative examples where the angle 264 and the angle 265 formed by angularly orienting the at least two parts 252 are different (as shown, for example, in FIG. 6), the shape of the resulting first joint interface surface 258 and the resulting second joint interface surface 260 may be different. In other examples, such as those illustrated, e.g., in FIGS. 8 and 9, the shape of the first joint interface surface 258 may be different than the shape of the second joint interface surface 260 even if the at least two parts are not at an angle relative to each other.

In one aspect of the disclosure, which may include at least a portion of the subject matter of any of the preceding and/or following examples and aspects, the method 2500 also includes forming the fillet contour 251 at the joint interface 250 along at least one of the first joint interface surface 258 and the second joint interface surface 260.

In one aspect of the disclosure, which may include at least a portion of the subject matter of any of the preceding and/or following examples and aspects, the fillet contour 251 is the fillet radius 253. In one aspect of the disclosure, which may include at least a portion of the subject matter of any of the preceding and/or following examples and aspects, the fillet radius 253 is substantially zero.

In one aspect of the disclosure, which may include at least a portion of the subject matter of any of the preceding and/or following examples and aspects, the first shoulder 210 includes the first contact portion 254 complementary to the first joint interface surface 258, the second shoulder 212 includes the second contact portion 256 facing the first contact portion 254 complementary to the second joint interface surface 260 and facing the first contact portion 254, the first shoulder 210 includes the third contact portion 268, and the second shoulder 212 includes the fourth contact portion 270 facing the third contact portion 268. The method 2500 also includes advancing the friction stir welding apparatus 202 along the joint interface 250 while rotating the pin tool 206, wherein at least one of the third contact portion 268 and the fourth contact portion 270 form the fillet contour 251 at the joint interface 250 along at least one of the first joint interface surface 258 and the second joint interface surface 260.

In one aspect of the disclosure, which may include at least a portion of the subject matter of any of the preceding and/or following examples and aspects, the method 2500 also includes cooling at least one of the first shoulder 210 and the second shoulder 212 using at least one cooling jacket (224 or 236) not substantially rotatable relative to the spindle housing 204.

Examples of the disclosure may be described in the context of an aircraft manufacturing and service method 2600 as shown in FIG. 26 and an aircraft 2700 as shown FIG. 27. During pre-production, the manufacturing and service method 2600 may include specification and design 2602 of the aircraft 2700 and material procurement 2604. During production, component and subassembly manufacturing 2606 and system integration 2608 of the aircraft 2700 take place. Thereafter, the aircraft 2700 may go through certification and delivery 2610 to be placed in service 2612. While in service by a customer, the aircraft 2700 is scheduled for routine maintenance and service 2614 (which may also include modification, reconfiguration, refurbishment, and so on).

Each of the processes of the manufacturing and service method 2600 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 27, the aircraft 2700 produced by the manufacturing and service method 2600 may include an airframe 2702 with at least two high-level systems 2704 and an interior 2706. Examples of the high-level systems 2704 include one or more of a propulsion system 2708, an electrical system 2710, a hydraulic system 2712, and an environmental system 2714. Any number of other systems may be included. Although an aerospace example is shown, the principles of the invention may be applied to other industries, such as the automotive industry.

Apparatus and methods shown or described herein may be employed during any one or more of the stages of the manufacturing and service method 2600. For example, components or subassemblies corresponding to component and subassembly manufacturing 2606 may be fabricated or manufactured in a manner similar to components or subassemblies produced while the aircraft 2700 is in service. Also, one or more aspects of the apparatus, method, or combination thereof may be utilized during the component and subassembly manufacturing 2606 and system integration 2608, for example, by substantially expediting assembly of or reducing the cost of the aircraft 2700. Similarly, one or more aspects of the apparatus or method realizations, or a combination thereof, may be utilized, for example and without limitation, while the aircraft 2700 is in service, e.g., maintenance and service 2614.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Having the benefit of the teachings presented in the foregoing description and the associated drawings, many modifications of the disclosed subject matter will become apparent to one skilled in the art to which this disclosure pertains. Therefore, it is to be understood that the disclosure is not to be limited to the specific examples and aspects provided and that modifications thereof are intended to be within the scope of the appended claims. Moreover, although the foregoing disclosure and the associated drawings describe certain illustrative combinations of elements and/or functions, it should be appreciated that different combinations of elements and/or functions may be realized without departing from the scope of the appended claims.

What is claimed is:

1. A friction stir welding apparatus comprising:
    a spindle housing;
    a pin tool concentric with an axis and rotatable about the axis relative to the spindle housing;
    a first shoulder not substantially rotatable about the axis relative to the spindle housing, wherein:
        the first shoulder comprises planar contact portions arranged at an angle relative to each other and oblique relative to the axis; and
        the axis bisects the angle at an apex thereof; and
    a second shoulder opposing the first shoulder and not substantially rotatable about the axis relative to the spindle housing, wherein the axis passes through the second shoulder.

2. The apparatus of claim 1, wherein the pin tool is movable along the axis relative to the first shoulder and is fixed along the axis relative to the second shoulder.

3. The apparatus of claim 1 further comprising:
    a first cooling jacket thermally coupled to the first shoulder; and
    a second cooling jacket thermally coupled to the second shoulder.

4. The apparatus of claim 3, wherein the first cooling jacket and the second cooling jacket are not substantially rotatable about the axis relative to the spindle housing.

5. The apparatus of claim 1, wherein the first shoulder includes an additional contact portion, and wherein the second shoulder includes a second contact portion facing the additional contact portion.

6. The apparatus of claim 5, wherein at least one of the additional contact portion and the second contact portion is discontinuous.

7. The apparatus of claim 5, wherein at least a part of one of the additional contact portion and the second contact portion is non-planar.

8. The apparatus of claim 5, wherein the additional contact portion and the second contact portion are mutually complementary.

9. The apparatus of claim 5, wherein the additional contact portion and the second contact portion are mutually symmetric.

10. The apparatus of claim 5, wherein the additional contact portion has a shape different from that of the second contact portion.

11. The apparatus of claim 5, wherein at least one of the additional contact portion and the second contact portion forms an edge.

12. The apparatus of claim 1, wherein the second shoulder comprises second planar contact portions arranged at a second angle relative to each other and oblique relative to the axis; and the axis bisects the second angle at an apex thereof.

13. The apparatus of claim 12, wherein the first planar contact portions and the second planar contact portions are mutually complementary.

14. The apparatus of claim 12, wherein the first planar contact portions and the second planar contact portions are mutually symmetric.

15. A friction stir welding apparatus for joining workpiece portions, the apparatus comprising:
    a spindle housing;
    a pin tool concentric with an axis and rotatable about the axis relative to the spindle housing;
    a first shoulder configured to contact at least one of the workpiece portions, and not substantially rotatable about the axis relative to the spindle housing, wherein:
        the first shoulder comprises planar contact portions arranged at an angle relative to each other and oblique relative to the axis; and
        the axis bisects the angle at an apex thereof; and
    a second shoulder configured to contact at least one of the workpiece portions, and not substantially rotatable about the axis relative to the spindle housing, wherein the axis passes through the second shoulder.

16. The apparatus of claim 15, wherein the pin tool is movable along the axis relative to the first shoulder and is fixed along the axis relative to the second shoulder.

17. The apparatus of claim 15 further comprising:
    a first cooling jacket thermally coupled to the first shoulder; and
    a second cooling jacket thermally coupled to the second shoulder.

18. The apparatus of claim 17, wherein the first cooling jacket is not substantially rotatable about the axis relative to the spindle housing.

19. The apparatus of claim 15, wherein the first shoulder further includes an additional contact portion, and wherein the second shoulder includes a second contact portion facing the additional contact portion.

20. The apparatus of claim 19, wherein at least one of the additional contact portion and the second contact portion is discontinuous.

21. The apparatus of claim 19, wherein at least a part of one of the additional contact portion and the second contact portion is non-planar.

22. The apparatus of claim 19, wherein the additional contact portion and the second contact portion are mutually complementary.

23. The apparatus of claim 19, wherein the additional contact portion and the second contact portion are mutually symmetric.

24. The apparatus of claim 19, wherein the additional contact portion has a shape different from that of the second contact portion.

25. The apparatus of claim 19, wherein at least one of the additional contact portion and the second contact portion forms an edge.

26. The apparatus of claim 15, wherein the second shoulder comprises second planar contact portions arranged at a second angle relative to each other and oblique relative to the axis; and the axis bisects the second angle at an apex thereof.

27. The apparatus of claim 26, wherein the first planar contact portions and the second planar contact portions are mutually complementary.

28. The apparatus of claim 26, wherein the first planar contact portions and the second planar contact portions are mutually symmetric.

29. A friction stir welding apparatus comprising:
    a spindle housing;

a pin tool concentric with an axis and rotatable about the axis relative to the spindle housing;

a first shoulder not substantially rotatable about the axis relative to the spindle housing, wherein:

the first shoulder comprises planar contact portions arranged at an angle relative to each other and oblique relative to the axis; and the axis bisects the angle at an apex thereof; and a second shoulder not substantially rotatable about the axis relative to the spindle housing, wherein the pin tool extends between the first and second shoulder.

30. The apparatus of claim 29, wherein the pin tool is movable along the axis relative to the first shoulder and is fixed along the axis relative to the second shoulder.

31. The apparatus of claim 29 further comprising:

a first cooling jacket thermally coupled to the first shoulder; and a second cooling jacket thermally coupled to the second shoulder.

32. The apparatus of claim 31, wherein the first cooling jacket is not substantially rotatable about the axis relative to the spindle housing.

33. The apparatus of claim 29, wherein the first shoulder further includes an additional contact portion, and wherein the second shoulder includes a second contact portion facing the additional contact portion.

34. The apparatus of claim 33, wherein at least one of the additional contact portion and the second contact portion is discontinuous.

35. The apparatus of claim 33, wherein at least a part of one of the additional contact portion and the second contact portion is non-planar.

36. The apparatus of claim 33, wherein the additional contact portion and the second contact portion are mutually complementary.

37. The apparatus of claim 33, wherein the additional contact portion and the second contact portion are mutually symmetric.

38. The apparatus of claim 33, wherein the additional contact portion has a shape different from that of the second contact portion.

39. The apparatus of claim 33, wherein at least one of the additional contact portion and the second contact portion forms an edge.

40. The apparatus of claim 29, wherein the second shoulder comprises second planar contact portions arranged at a second angle relative to each other and oblique relative to the axis; and the axis bisects the second angle at an apex thereof.

41. The apparatus of claim 40, wherein the first planar contact portions and the second planar contact portions are mutually complementary.

42. The apparatus of claim 40, wherein the first planar contact portions and the second planar contact portions are mutually symmetric.

* * * * *